United States Patent
Hor-Lao et al.

(10) Patent No.: US 10,074,268 B2
(45) Date of Patent: Sep. 11, 2018

(54) WIRELESS RFID-BASED SYSTEM FOR PERSONALIZED ADJUSTMENTS AND MONITORING

(71) Applicant: Motorola Mobility LLC, Chicago, IL (US)

(72) Inventors: Mary Khun Hor-Lao, Chicago, IL (US); Binesh Balasingh, Naperville, IL (US); Douglas Alfred Lautner, Round Lake, IL (US); Jagatkumar Shah, Lake in The Hills, IL (US); Scott P. DeBates, Crystal Lake, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/389,262

(22) Filed: Dec. 22, 2016

(65) Prior Publication Data
US 2018/0182236 A1    Jun. 28, 2018

(51) Int. Cl.
| | |
|---|---|
| *G08C 17/02* | (2006.01) |
| *H04W 4/00* | (2018.01) |
| *G08B 21/04* | (2006.01) |
| *H04W 4/80* | (2018.01) |

(52) U.S. Cl.
CPC ......... *G08C 17/02* (2013.01); *G08B 21/0438* (2013.01); *H04W 4/008* (2013.01); *H04W 4/80* (2018.02); *G08C 2201/50* (2013.01); *G08C 2201/91* (2013.01)

(58) Field of Classification Search
CPC .... G08C 17/02; G08B 21/0438; H04W 4/008
See application file for complete search history.

(56) References Cited

U.S. PATENT DOCUMENTS

| | | | |
|---|---|---|---|
| 6,505,780 B1 | 1/2003 | Yassin et al. | |
| 6,964,370 B1 | 11/2005 | Hagale et al. | |
| 2009/0044334 A1 | 2/2009 | Parsell et al. | |
| 2011/0092890 A1 | 4/2011 | Stryker et al. | |
| 2011/0309937 A1 | 12/2011 | Bunza et al. | |
| 2014/0232519 A1 | 8/2014 | Allen et al. | |
| 2015/0145671 A1* | 5/2015 | Cohen ............... | G08B 21/18 340/539.11 |
| 2016/0256100 A1* | 9/2016 | Jacofsky ............... | A47C 31/123 |
| 2016/0262924 A1* | 9/2016 | Abreu ................. | A43B 7/04 |
| 2016/0354027 A1* | 12/2016 | Benson ................ | A61M 21/02 |
| 2017/0135881 A1* | 5/2017 | Franceschetti ....... | A61G 7/018 |
| 2018/0182253 A1 | 6/2018 | Hor-Lao et al. | |

FOREIGN PATENT DOCUMENTS

WO    WO-2015137999    9/2015

OTHER PUBLICATIONS

"Combined Search and Examination Report", GB Application No. 1720860.4, dated Jun. 15, 2018, 8 pages.

\* cited by examiner

*Primary Examiner* — Curtis Odom

(57) ABSTRACT

A user's interaction with a product is monitored using one or more sensors on an RFID tag to gather information associated with the user's interaction with the product. Based on the user's interaction and gathered information, an adjustment is made to the product that is personalized to the user.

20 Claims, 18 Drawing Sheets

WIRELESS RFID-BASED SYSTEM FOR PERSONALIZED ADJUSTMENTS AND MONITORING

BACKGROUND

All human needs are different. For example, when a human engages with a particular product that has adjustable features, the human will typically adjust the features to a setting that is desirable to them. The next human who interacts with or engages with the particular product may reset and/or manually readjust the features. For example, a car seat has adjustable features that include back and forth features, up-and-down features, and back tilt features. Each user will typically adjust the features of the car seat to fit their own desired settings.

Requiring a human to manually reset product features can, in many instances, constitute an undesirable inconvenience.

BRIEF DESCRIPTION OF THE DRAWINGS

Embodiments of glove-based weight tracking are described with reference to the following Figures. The same numbers may be used throughout to reference like features and components that are shown in the Figures.

DETAILED DESCRIPTION

Figure 1:
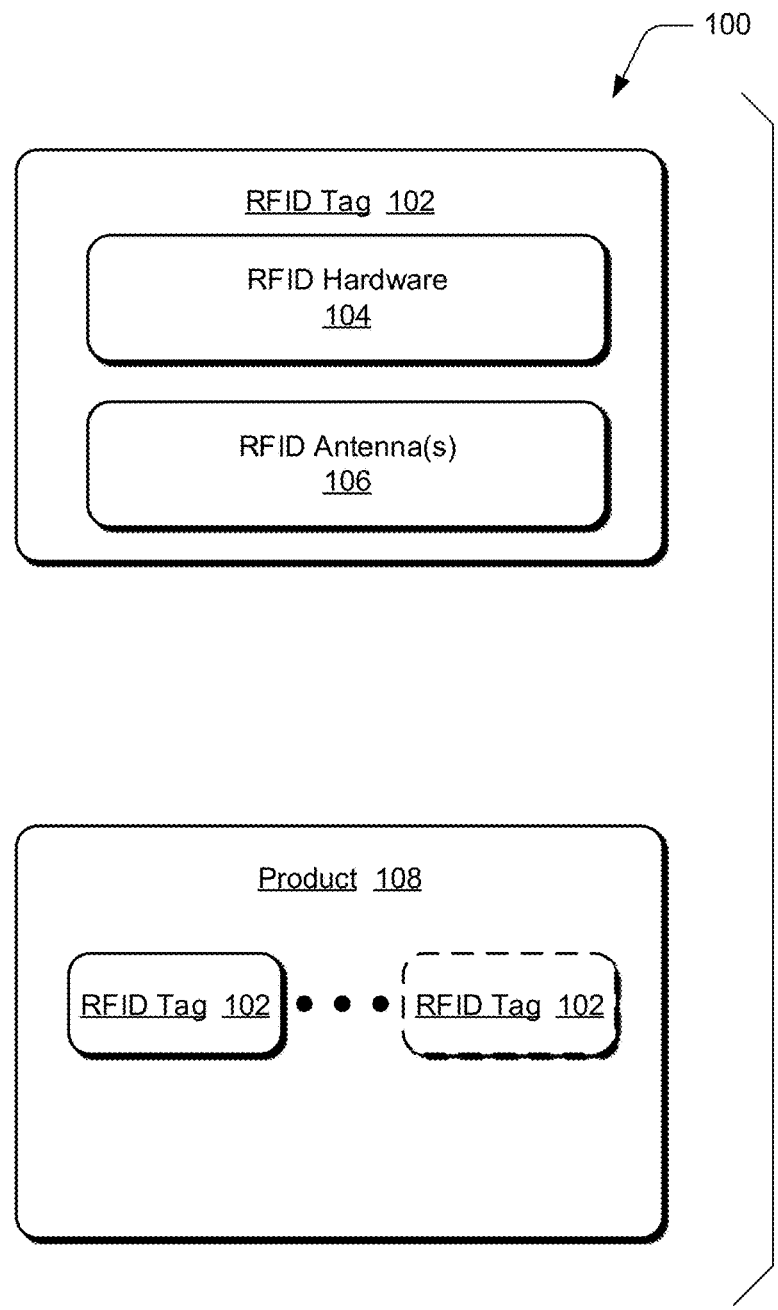
FIG. 1 illustrates an example system in which embodiments of wireless system-based personalized adjustments and monitoring can be implemented.

Embodiments of wireless system-based personalized adjustments and monitoring are described. In some instances, the wireless system-based adjustments and monitoring are performed by RFID tag-based systems. In various embodiments, a user may interact with a product in some way. A "product" can include, by way of example and not limitation, any suitable type of product such as a medical product, a prosthetic product, a recreational product, a furniture product such as one that might be found in a home or a conveyance such as a car, airplane, or train, and the like. Various embodiments utilize a tracking system to monitor and track a user's interaction with a product. The tracking system can include a wireless radio system in order to report information associated with the user's product interaction to a third-party for analysis. The analysis can result in notifications being generated and provided to the user to advise the user regarding the user's interaction. The analysis can also result in automatic adjustments being made to the product. Any suitable type of tracking system employing a wireless radio system can be utilized. One such tracking system utilizes a wireless radio system in the form of an RFID tag and RFID reader.

In at least some embodiments, one or more RFID tags are used to make adjustments to the product that are personalized to the user. By "personalized" is meant that the adjustments are specific to the user and are based on the user's interaction with the product. In some implementations, an RFID tag may be worn by or otherwise associated with the user and may include, or provide access to user profile information that can be used to make adjustments to the product. Alternately or additionally, an RFID tag or a system of RFID tags may be associated with the product, as by being mounted on, in, or otherwise borne by the product in some manner. The RFID tag or tags may include multiple different types of sensors that gather information associated with the user's interaction with the product. The information that is gathered by the sensors may then be used to make adjustments to the product that are personalized to the user.

For example, product-based RFID tags and the associated sensors may gather information associated with environmental parameters describing the user's interaction with the product. This can include parameters that describe the way and manner in which the user interacts with the product. The environmental parameters can then be used to make adjustments to the product that fit the user. The environmental parameters can, alternately or additionally, be used to provide notifications to the user with respect to their interaction with the product. The notifications can include different types of notifications such as remedial notifications, diagnostic notifications, and the like. Remedial notifications are those that attempt to remedy, in some manner, the user's interaction with the product. Diagnostic notifications are those that provide diagnostic information that is derived from or otherwise ascertained from the user's interaction with the product.

Personalized adjustments can be made on a local or remote basis. When personalized adjustments are locally-based, the environmental parameters can be used to make product adjustments without necessarily communicating the environmental parameters and other information to a remote source, such as a cloud-based service. Alternately, when personalized adjustments are remotely-based, the environmental parameters can be used to make product adjustments by communicating the environmental parameters and other information to a remote source, such as a cloud-based service. The cloud-based service may employ a database that includes a number of different user profiles. Each user profile includes information about a particular user, such as environmental parameter values that have been assigned to or otherwise associated with an individual user. When the cloud-based service receives the environmental parameters from the RFID tag or tags, the cloud-based service can cross reference the database, or another source such as a human individual, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the tracking system and cause personalized adjustments to be made to the product.

Consider now an example operating environment in accordance with one or more embodiments.

Example Operating Environment

FIG. 1 illustrates an example operating environment generally at 100. In this example, the operating environment includes a tracking system and wireless radio system that includes one or more RFID tags 102 and one or more products 108. An RFID tag 102 may be worn by a user and may include information associated with the user such as user profile information, a unique identifier for the user, and the like. Product 108 may include one or more RFID tags 102 that include components that are the same as or similar to those in the upper-most depicted RFID tag 102. The RFID tag 102 includes RFID hardware 104 and one or more RFID antennas 106. The RFID hardware and antenna(s) operate as described below.

In operation, the RFID tag 102 can assume an activated state or an un-activated state. In the activated state, the RFID tag 102 is operational and can perform operations including, by way of example and not limitation, collecting data, receiving transmitted data, and/or transmitting data. In the un-activated state, the RFID tag 102 is less or differently operational than when in the activated state. In some instances, the un-activated state can correspond to when the RFID tag 102 is not operational.

The RFID tags are configured to enable RFID tag-based monitoring, tracking, and personalized adjustments to be made as described above and below. Having considered an example operating environment, consider now an RFID tag in accordance with one or more embodiments.

Example RFID Tag

Figure 2:
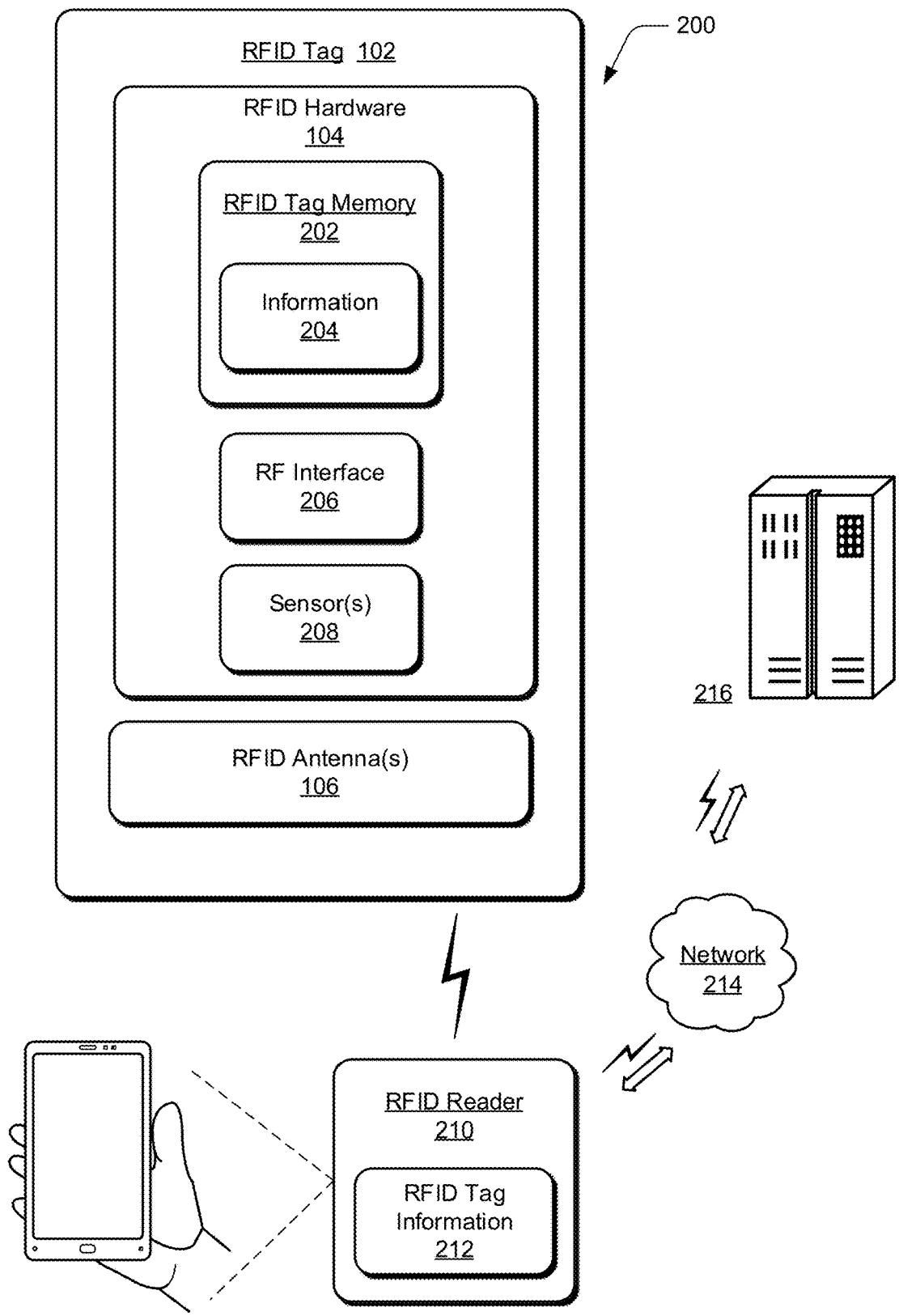
FIG. 2 illustrates an example system in which embodiments of wireless system-based personalized adjustments and monitoring can be implemented.

FIG. 2 illustrates an example tracking system 200 that includes RFID tag 102. The RFID tag 102 includes RFID hardware 104 and one or more RFID antenna 106. The RFID hardware 104 includes RFID tag memory 202 that stores various information 204, an RF interface 206, and one or more sensors 208 that operate as described above and below. System 200 also includes an RFID reader 210 that maintains RFID tag information 212. The RFID tag may be an active RFID tag or a passive RFID tag. Active RFID tags are typically battery powered. For active RFID tags, the sensors 208 may be powered by the internal battery. Passive RFID tags, on the other hand, have no internal power source. Rather, passive RFID tags are powered by electromagnetic energy transmitted from an RFID reader. In these instances, one or more capacitors can be employed to hold a charge that is used to power the sensors. In some cases, input to the sensor or sensors can be used to drive the RFID tag.

In this example, RFID tag 102 is implemented to store, in RFID tag memory 202, information that can include, by way of example and not limitation, user information associated with a particular user, product information associated with a particular product, information collected about the user by one or more sensors 208 on the RFID tag 102, information collected about the user and the user's interaction with the product, and the like.

In the illustrated and described embodiment, sensors 208 can include any suitable type of sensors arranged in any suitable type of arrangement. The sensors can include, by way of example and not limitation, force sensors, accelerometers, gyroscopic sensors, temperature sensors, various physiological sensors such as heart rate sensors and the like, positional sensors, counters, and the like.

The RFID tag 102 is also implemented for two-way wireless communication with RFID readers, such as the RFID reader 210 (also referred to as a RFID interrogator) that interrogates the RFID tag 102 for various information 204 that is stored in the RFID tag memory 202. Generally, RFID tags are small electronic tags or labels that can be programmed with data and other information. The RFID reader 210 can transmit an interrogation signal as a broadcast message requesting RFID tags that are in range to return the data and information that the RFID tags have stored. The RFID tags can then wirelessly communicate the data and information to the RFID reader via a radio frequency (RF) communication channel, which the RFID reader 210 receives as the RFID tag information 212.

In implementations, RFID tag 102 can include an ASIC/CPU module and a transmitter and receiver (or transceiver) for two-way communication with the RFID reader 210. In response to receipt of an interrogation signal, the ASIC/CPU module of the RFID tag 102 formulates a response that may include data from the RFID tag, and the response is wirelessly transmitted to the RFID reader. The response signals from RFID tag 102 can be communicated using low frequency (LF), high frequency (HF), or ultra-high frequency (UHF) radio waves. The RFID tag data can be stored in non-volatile memory, and the ASIC/CPU module can be implemented as fixed or programmable logic for processing the RFID tag data, as well as modulating and demodulating the RF signals.

In implementations, the RFID tag memory 202 (e.g., non-volatile memory) can be accessed by the RFID reader 210 via a radio frequency (RF) interface 206 of the RFID tag 102.

The example system 200 also includes a network 214 that generally represents any type of communication and data network, and one or more servers 216 that can communicate via the network 214 (or combination of networks), such as for data communication between the RFID reader 210 and the server 216. The network 214 can be implemented to include wired and/or wireless networks. The network can also be implemented using any type of network topology and/or communication protocol, and can be represented or otherwise implemented as a combination of two or more networks, to include cellular networks, IP-based networks, and/or the Internet. The network 214 may also include mobile operator networks that are managed by a network provider of a cellular network, a mobile network operator, and/or other network operators, such as a communication service provider, mobile phone provider, and/or Internet service provider.

In at least some embodiments, information read by RFID reader 210 from RFID tag 102 can be utilized to communicate with server 216 by way of network 214. For example, in some instances information read from RFID tag 102 may include a website or other network location to which information can be conveyed. For example, the website may be that of a company that provides a service, such as a remediation service, diagnostic service, medical monitoring service, physical therapy service, physical training service, and the like. For example, information read by RFID reader 210 and conveyed to server 216 may include information, such as environmental parameter values that can be used remediate or diagnose a particular user associated with the RFID tag 102. Examples of this are provided below.

In this instance, the RFID reader 210 may comprise part of a computing device, such as a handheld device, e.g., a smart phone, that has an application that can access the website. The RFID reader 210 can comprise any suitable type of computing device. Further, information read by RFID reader 210 from RFID tag 102 may be used to verify the authenticity of the RFID tag. For example, RFID reader 210 may interrogate RFID tag 102 to receive encrypted information that can be used to authenticate or verify the authenticity of RFID tag 102. This can be done through communication with server 216 by way of network 214.

Having considered an example RFID tag and system, consider now various implementation examples.

Implementation Examples

Figure 3:
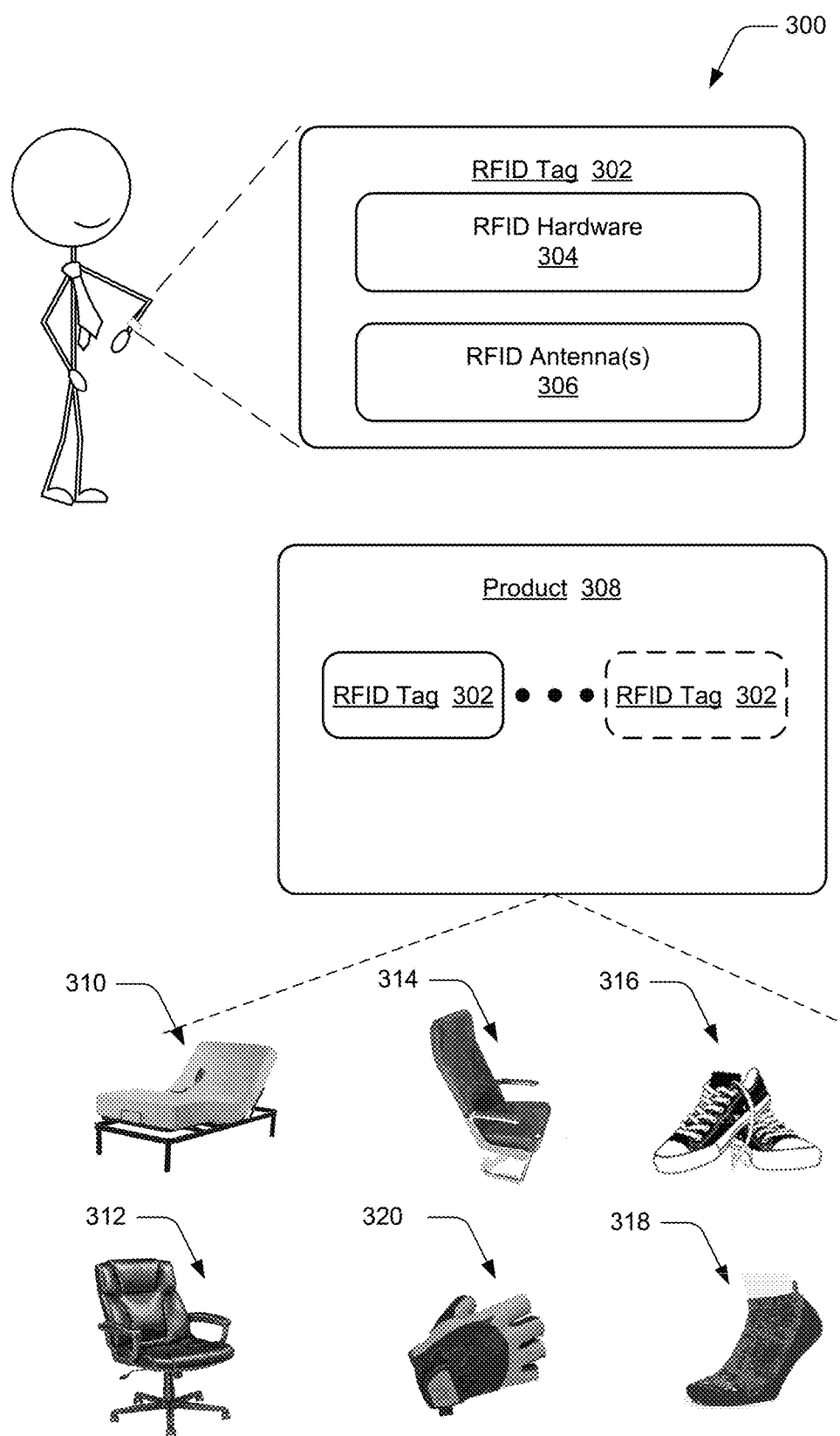
FIG. 3 illustrates an example system in which embodiments of wireless system-based personalized adjustments and monitoring can be implemented.

FIG. 3 illustrates an example system generally at 300 that includes a user wearing an RFID tag 302 that includes RFID hardware 304 and one or more RFID antennas 306 as described above. System 300 also includes a product 308 having one or more RFID tags 302.

As noted above, product 308 can include any suitable type of product. Examples of suitable products include, by way of example and not limitation, a bed such as an adjustable bed having an adjustable mattress 310, a chair 312 such as an office chair, a seat such as an airline seat 314, shoes 316, compression socks 318, gloves 320, and the like.

In operation, as a user interacts with product 308, RFID tags 302 associated with the product gather information associated with environmental parameters describing the user's interaction with the product. The information can be gathered through the use of one or more sensors such as those described in connection with FIG. 2. The information gathered by the sensors can be read by a suitable RFID reader and used to make adjustments to the product 308 or to make recommendations or provide notifications to the user.

For example, the user may have an RFID reader on their person in the form of a computing device, such as a smart phone. The RFID reader can interrogate the RFID tags associated with the product and ascertain information associated with the environmental parameters describing the user's interaction with the product. The user's computing device may include environmental parameter values that have been assigned to or otherwise associated with an individual user. The computing device can compare the information received by interrogating the RFID tags with the environmental parameter values that have been assigned to the user. The computing device can then cause any modifications to settings of the product 308 so that the environmental parameters associated with the user's interaction with the product are more aligned with the environmental parameter values for that particular user.

Alternately or additionally, information gathered by the sensors can be read by a suitable RFID reader as described above, and communicated to a remote source, such as a cloud-based service. In so doing, the computing device can also convey information, such as a user's unique ID and other information maintained by the RFID tag worn by the user. The cloud-based service can then use the information provided by both the user and the RFID tags associated with the product to cause modifications or adjustments to the product that are more aligned with environmental parameter values for that particular user. To do so, in some embodiments, the cloud-based service may maintain a database that includes information associated with a number of different users by way of user profiles for each user. The user profiles can contain information about a particular user, such as environmental parameter values that have been assigned to or otherwise associated with the particular user. The cloud-based service can use the environmental parameters from RFID tag or tags and the information contained in the database to then cause modifications or adjustments to be made to the product so that the environmental parameters associated with the user's interaction with the product are more aligned with the environmental parameter values for that particular user.

Example method 400 is described with reference to FIG. 3 in accordance with implementations of RFID tag-based monitoring and personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
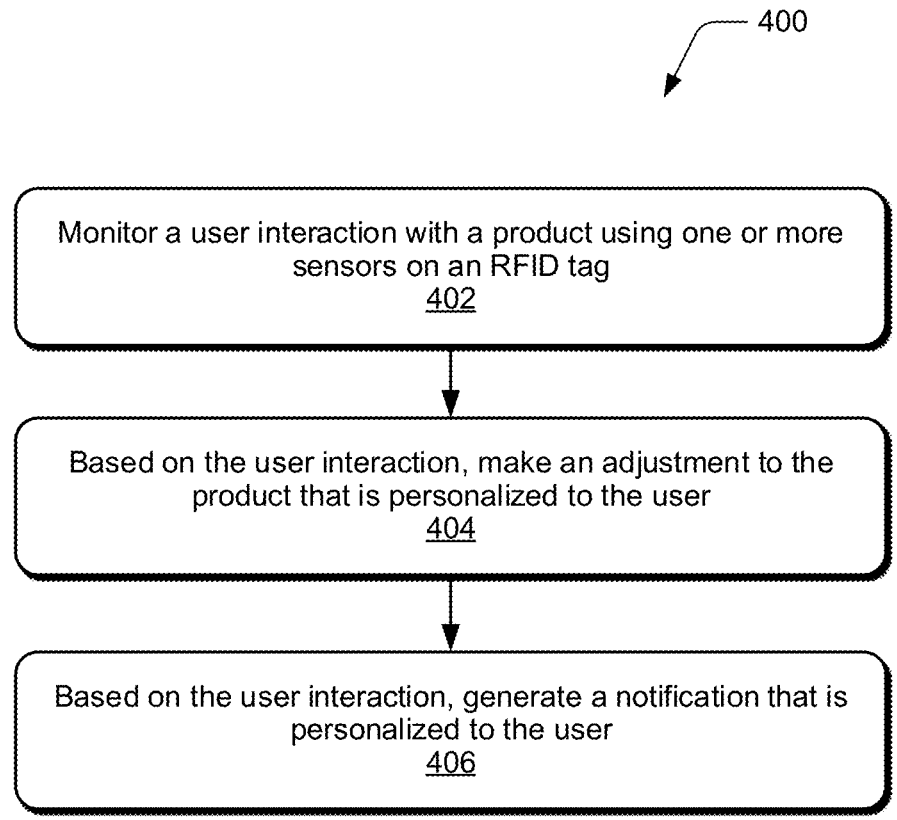
FIG. 4 illustrates an example method in accordance with one or more embodiments.

FIG. 4 illustrates an example method 400 of RFID tag-based monitoring and personalized adjustments as described herein, and is generally described with reference to systems described in FIGS. 1-3. The order in which the method is described is not intended to be construed as a limitation, and any number or combination of the described method operations can be performed in any order to perform a method, or an alternate method.

At 402, a user's interaction with a product is monitored using one or more sensors on an RFID tag. Any suitable type of user interaction can be monitored, examples of which are provided below. In addition, any suitable type of product can be monitored for user interactions, such as the products illustrated in FIG. 3 as well as others. In addition, any suitable type of sensors can be utilized to monitor a user's interaction. Examples of suitable sensors are provided above and below. In the illustrated and described embodiment, the sensor or sensors on the RFID tag(s) gather information associated with the user's interaction with the product. The information that is gathered can be associated with environmental parameters describing the user's interaction with the product. Environmental parameters refer to or otherwise describe the way and manner in which the user interacts with the product, and any effect that the user may impart to the product. For example, when a user interacts with the product, the user may cause a physical effect with respect to the product. That is, the user may cause the product to behave in a certain way, adopt a certain physical disposition, move in a particular manner, and the like.

Based on the user's interaction, an adjustment is made to the product, at 404. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user. The information received by the cloud-based service can be utilized and compared to the parameter values for the individual user so that any personalized adjustments can be conveyed back to the product by way of the network. Examples of how this can be done are provided below.

Based on the user's interaction with the product, a notification can also be generated that is personalized to the user at 406. Any suitable type of notification can be generated. For example, a remedial notification can be generated. Alternately or additionally, a diagnostic notification can be generated. The generated notification can then be conveyed to the user in either a locally-based manner or a remotely-based manner. Local-based notifications refer to those notifications that are generated and provided locally, such as by the user's computing device. Remotely-based notifications refer to those notifications that come from a remote source, such as a source that is accessible over a network such as the Internet.

Having considered a discussion of how RFID tag-based monitoring and personalized adjustments can be made, consider now various use cases that provide specific examples of how the above-described techniques can be implemented with specific products.

Use Case—Adjustable Mattress or Bed

Figure 5:
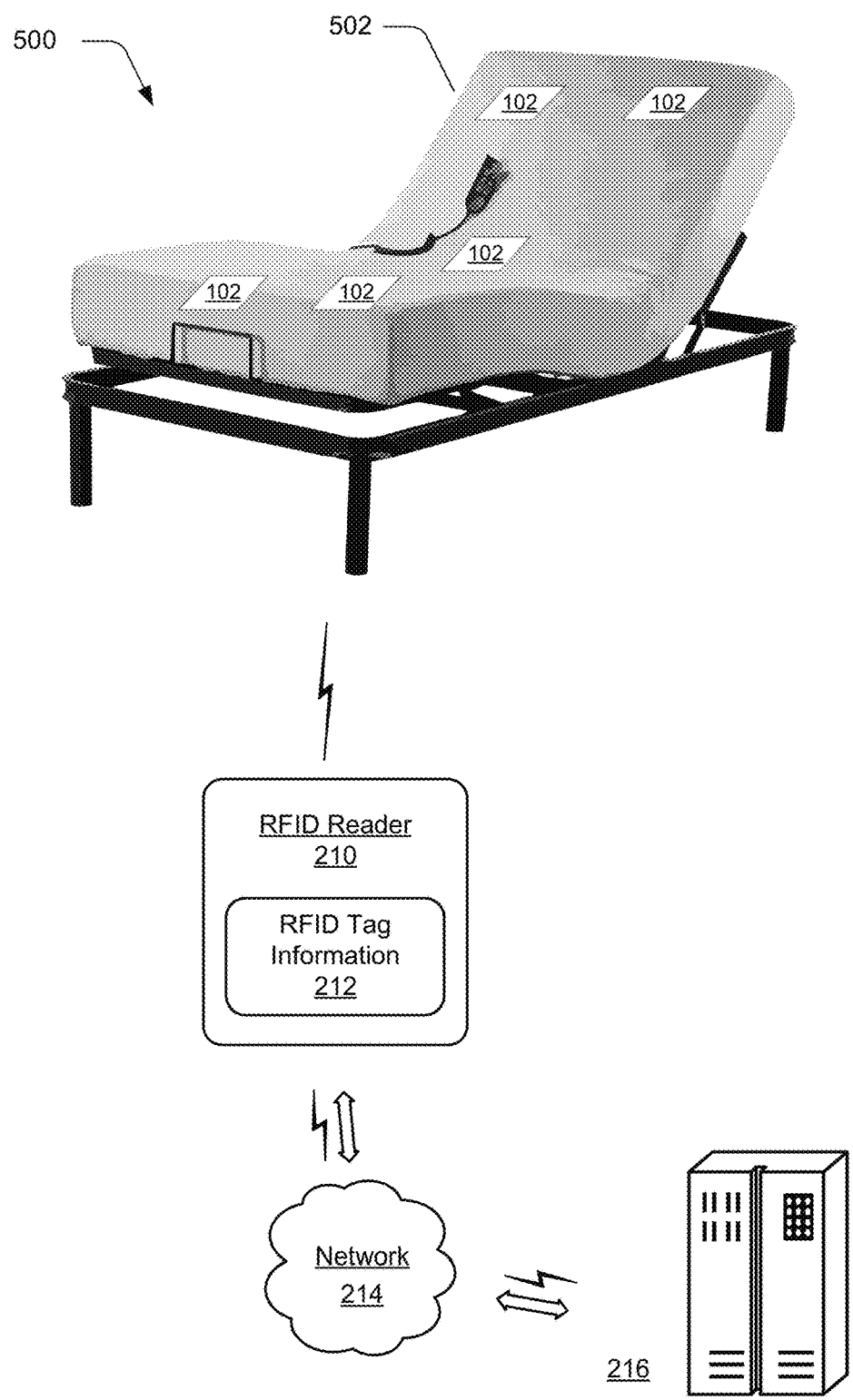
FIG. 5 illustrates an example system in which embodiments of wireless system-based personalized adjustments and monitoring can be implemented.

FIG. 5 illustrates an example system, generally at 500, that includes a product in the form of an adjustable mattress 502 that is part of an adjustable bed. Adjustable mattresses and beds can be used in many settings such as, by way of example and not limitation, home settings, hospital settings, convalescent home settings, retirement home settings and the like. Adjustable mattress 502 includes an array of RFID tags 102 (FIGS. 1 and 2) that are mounted thereon. System 500 also includes an RFID reader 210 having RFID tag information 212 as described above in relation to FIG. 2. In one or more embodiments, system 500 also includes a network 214 and one or more servers 216, as described above in relation to FIG. 2. The servers can, in some embodiments, implement a cloud-based service.

In the illustrated and described embodiment, each of the RFID tags 102 includes one or more sensors that monitor a user's interaction with the mattress 502 and bed. As noted above, the sensors can include any suitable type of sensors such as, by way of example and not limitation, force sensors, temperature sensors, position sensors, timing sensors, and the like.

When a user interacts with the mattress and bed, the sensors gather information associated with the user's interaction. In some instances, the user's interaction may include laying on the mattress 502 for a period of time, elevating the mattress, and the like. The sensors, in turn, can gather information associated with the period of time the user has laid on the mattress, the amount of time the user has laid on the mattress without moving, the elevation of the mattress, the firmness of the mattress, the force being exerted on the mattress, the mattress contour or the user's pressure contour, and the like. This gathered information represents environmental parameters describing the user's interaction with the mattress 502. This information can then be used to make personalized adjustments to the mattress that fit the user.

For example, consider a medical use case scenario where the mattress 502 and bed are in a medical setting such as a hospital or convalescent home. Assume that the user has a profile that describes parameter values associated with the mattress 502 such as, by way of example and not limitation, mattress rigidity, mattress inflation factors, elevation ranges, desired temperature ranges, amount of time the user may remain motionless, and the like. In this case, a medical professional may have defined the parameter values for the user based on a rehabilitation strategy. As a user interacts with the mattress, the user may environmentally impact the mattress in a manner which creates environmental parameters that exceed the environmental parameter values defined by the medical professional. If such is the case, based on the monitored environmental parameters, personalized adjustments can be made to the mattress 502 or bed or notifications can be generated.

So, for example, if the user has laid on the mattress long enough to change the inflation factors that have been defined for the mattress, such information can be used to cause a personalized adjustment to be made to the mattress to bring the inflation factor back within the defined environmental parameter values. Further, if the user has remained motionless for a defined period of time, the mattress or any portion of the mattress may be inflated and/or deflated to reform the mattress shape to facilitate user movement. For example, to help avoid bed sores and to facilitate user movement, one side of the mattress may be deflated slightly (e.g., the left side), while the other side of the mattress might be inflated slightly (e.g., the right side) to help the user roll over on their left side. The monitoring can be continued indefinitely so that the user is constantly monitored. Adjustments can be locally-based or remotely-based as described above. As another example, the user may be convalescing from a back or neck injury and, accordingly, a medical professional may have defined environmental parameter values that describe desired elevation ranges of mattress 502. The user may, in the course of interacting with the mattress 502, adjust the mattress to an elevation that is outside of the defined elevation range. In this case, the environmental parameters associated with the user's interaction can be monitored and personalized adjustments can be made to the mattress to bring the mattress back within the environmental parameter values that have been defined for the mattress's elevation. Again, these adjustments can be locally-based or remotely-based.

Further, the user may have remained motionless for a period of time that exceeds the environmental parameter values that have been defined for that user. In this case, a notification can be generated and provided to the user that they should move or change their position on the mattress. This is useful in preventing bedsores.

As noted above, personalized adjustments to the mattress 502 can be made on a local or remote basis. When personalized adjustments are to the mattress are locally-based, the environmental parameters monitored by the RFID tags 102 can be used to make adjustments without necessarily communicating the environmental parameters and other information to a remote source, such as a cloud-based service. Alternately, when personalized adjustments to the mattress are remotely-based, the environmental parameters can be used to make adjustments by communicating the environmental parameters and other information to a remote source, such as a cloud-based service supported by server 216. The cloud-based service may employ a database that includes a number of different user profiles. Each user profile includes information about a particular user, such as environmental parameter values that have been assigned to or otherwise associated with an individual user by, for example, a medical professional. When the cloud-based service receives the environmental parameters from the RFID tag or tags, the cloud-based service can cross reference the database, or another source such as a human individual such as the medical professional, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the RFID tags or other system components and cause personalized adjustments to be made to the product. This can include, by way of example and not limitation, communicating information back to a mattress-controlling system that can automatically cause mattress and/or bed adjustments to be made in a manner that are personalized to the user.

Example method 600 is described with reference to FIG. 5 in accordance with implementations of RFID tag-based monitoring and personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
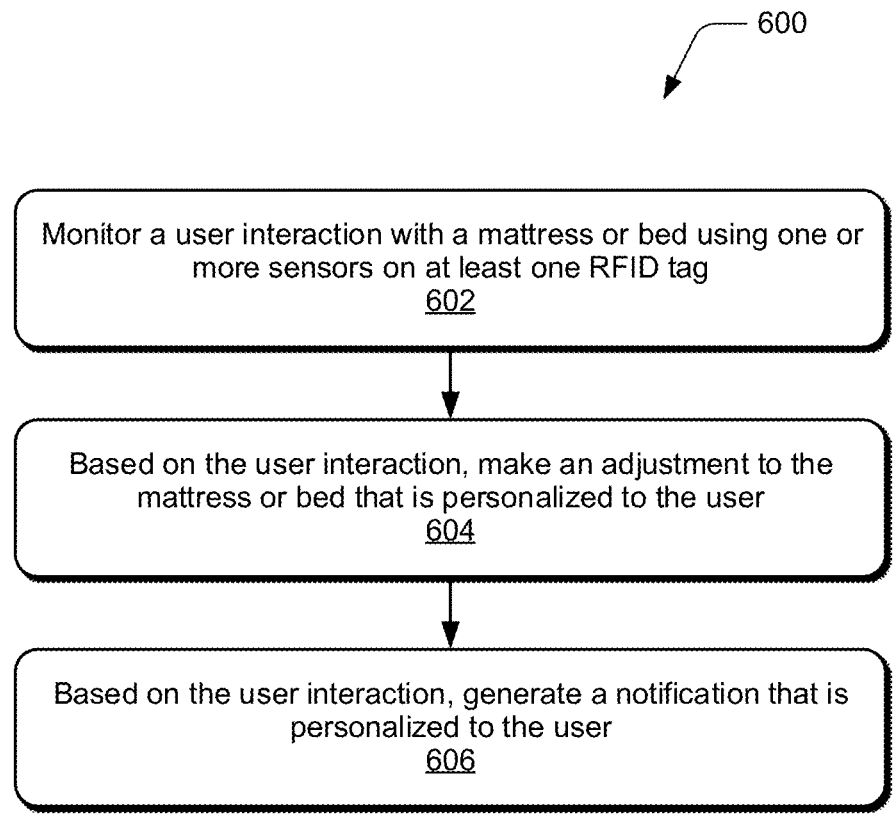
FIG. 6 illustrates an example method in accordance with one or more embodiments.

FIG. 6 illustrates an example method 600 of RFID tag-based personalized adjustments as described herein, and is generally described with reference to systems described in FIGS. 1-3 and 5. The order in which the method is described is not intended to be construed as a limitation, and any number or combination of the described method operations can be performed in any order to perform a method, or an alternate method.

At 602, a user's interaction with a mattress or bed is monitored using one or more sensors on one or more RFID tag. Any suitable type of user interaction can be monitored, examples of which are provided above. In addition, any suitable type of sensors can be utilized to monitor a user's interaction. Examples of suitable sensors are provided above. In the illustrated and described embodiment, the sensor or sensors on RFID tag gather information associated with the user's interaction with the mattress or bed. The information that is gathered can be associated with environmental parameters describing the user's interaction with the mattress or bed as described above.

Based on the user's interaction, an adjustment is made to the mattress or bed, at 604. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user, as described above. The information received by the cloud-based service can be utilized and compared to the parameter values for the individual user so that any personalized adjustments can be conveyed back to the product by way of the network. Examples of how this can be done are provided above.

Based on the user's interaction, a notification can also be generated that is personalized to the user at 606. Any suitable type of notification can be generated. For example, a remedial notification can be generated. Alternately or additionally, a diagnostic notification can be generated. The generated notification can then be conveyed to the user in either a locally-based manner or a remotely-based manner. Local-based notifications refer to those notifications that are generated and provided locally, such as by the user's computing device. Remotely-based notifications refer to those notifications that come from a remote source, such as a source that is accessible over a network such as the Internet.

Having considered a use case in association with a mattress or bed, consider now a use case associated with an adjustable chair.

Use Case—Adjustable Chair

Figure 7:
FIG. 7 illustrates an example system in which embodiments of wireless system-based personalized adjustments and monitoring can be implemented.

FIG. 7 illustrates an example system, generally at 700, that includes a product in the form of an adjustable chair 702. Adjustable chair 702 includes an array of RFID tags 102 (FIGS. 1 and 2) that are mounted thereon. System 700 also includes an RFID reader 210 having RFID tag information 212 as described above in relation to FIG. 2. In one or more embodiments, system 700 also includes a network 214 and one or more servers 216, as described above in relation to FIG. 2. The servers can, in some embodiments, implement a cloud-based service.

In the illustrated and described embodiment, each of the RFID tags 102 includes one or more sensors that monitor a user's interaction with the chair 702. As noted above, the sensors can include any suitable type of sensors such as, by way of example and not limitation, force sensors, temperature sensors, position sensors, timing sensors, and the like.

When a user interacts with the chair, the sensors gather information associated with the user's interaction. In some instances, the user's interaction may include sitting in the chair for a period of time, reclining the chair, and the like. The sensors, in turn, can gather information associated with the period of time the user has sat in the chair, the reclining angle of the chair, the force being exerted on the chair, the chair contour or the user's pressure contour, and the like. This gathered information represents environmental parameters describing the user's interaction with the chair 702. This information can then be used to make personalized adjustments to the chair that fit the user or to provide notifications to the user.

For example, consider an office use case scenario where the chair 702 is in an office setting. Assume that the user has a profile that describes parameter values associated with the chair 702 such as, by way of example and not limitation, chair rigidity, reclining ranges, and the like. In this case, an orthopedic medical professional may have defined the parameter values for the user based on a rehabilitation strategy or a strategy designed to avoid injury or undesirable conditions such as blood pooling in the legs and lack of movement. As a user interacts with the chair, the user may environmentally impact the chair in a manner which creates environmental parameters that exceed the environmental parameter values defined by the orthopedic professional. If such is the case, based on the monitored environmental parameters, personalized adjustments can be made to the chair 702 or notifications or warnings can be issued. So, for example, if the user has sat in the chair for a long period of time, such information can be used to cause a personalized adjustment to be made to the chair such as by inflating the seat or back cushion to bring the inflation factor back within the defined environmental parameter values. Alternately or additionally, if the user has sat in the chair for a prolonged period of time, a notification might be automatically issued to inform the user that they should stand, stretch, and walk around.

Adjustments can be locally-based or remotely-based as described above. As another example, the user may be convalescing from a back or neck injury and, accordingly, an orthopedic professional may have defined environmental parameter values that describe desired reclining ranges of the chair 702 or maximum sitting durations. The user may, in the course of interacting with the chair 702 adjust the chair to a recline mode that is outside of the defined reclining range. In this case, the environmental parameters associated with the user's interaction can be monitored and personalized adjustments can be made to the chair to bring the chair back within the environmental parameter values that have been defined for the chair's reclining range. Again, these adjustments can be locally-based or remotely-based.

As noted above, personalized adjustments to the chair 702 can be made on a local or remote basis. When personalized adjustments to the chair are locally-based, the environmental parameters monitored by the RFID tags 102 can be used to make adjustments without necessarily communicating the environmental parameters and other information to a remote source, such as a cloud-based service. Alternately, when personalized adjustments to the chair are remotely-based, the environmental parameters can be used to make adjustments by communicating the environmental parameters and other information to a remote source, such as a cloud-based service supported by server 216. The cloud-based service may employ a database that includes a number of different user profiles. Each user profile includes information about a particular user, such as environmental parameter values that have been assigned to or otherwise associated with an individual user by, for example, an orthopedic professional. When the cloud-based service receives the environmental parameters from the RFID tag or tags, the cloud-based service can cross reference the database, or another source such as a human individual such as the orthopedic professional, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the RFID tags and cause personalized adjustments to be made to the chair. This can include, by way of example and not limitation, communicating information back to a chair-controlling system that can automatically cause chair adjustments to be made in a manner that are personalized to the user.

Example method 800 is described with reference to FIG. 7 in accordance with implementations of RFID tag-based monitoring and personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
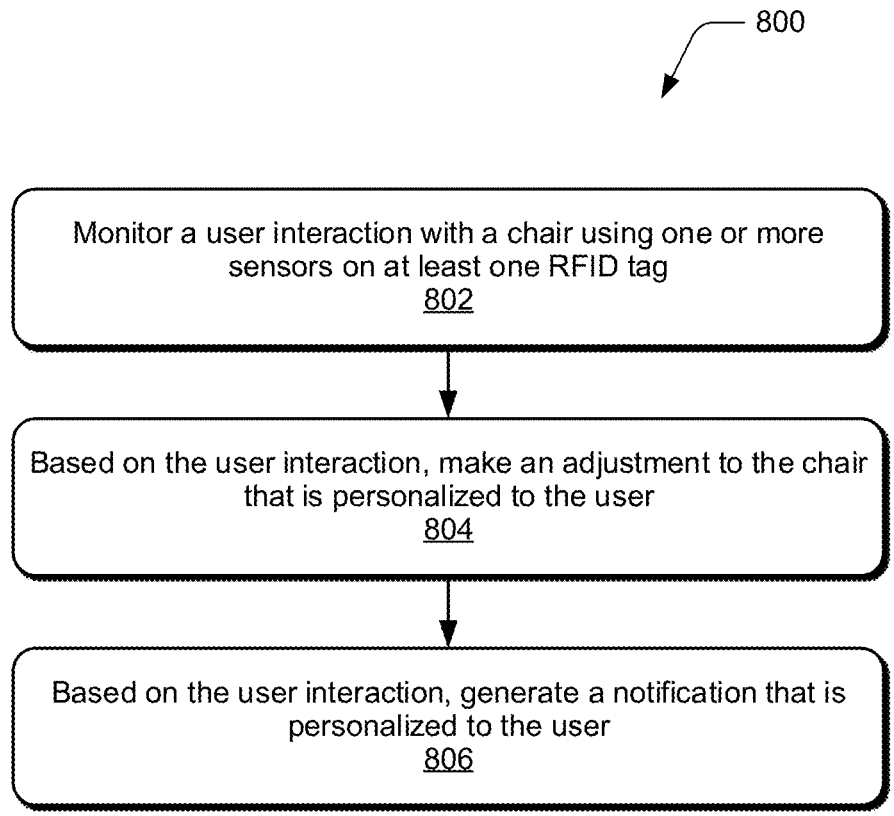
FIG. 8 illustrates an example method in accordance with one or more embodiments.

FIG. 8 illustrates an example method 800 of RFID tag-based monitoring and personalized adjustments as described herein, and is generally described with reference to systems described in FIGS. 1-3 and 7. The order in which the method is described is not intended to be construed as a limitation, and any number or combination of the described method operations can be performed in any order to perform a method, or an alternate method.

At 802, a user's interaction with a chair is monitored using one or more sensors on one or more RFID tag. Any suitable type of user interaction can be monitored, examples of which are provided above. In addition, any suitable type of sensors can be utilized to monitor a user's interaction. Examples of suitable sensors are provided above. In the illustrated and described embodiment, the sensor or sensors on RFID tag gather information associated with the user's interaction with the chair. The information that is gathered can be associated with environmental parameters describing the user's interaction with the chair as described above.

Based on the user's interaction, an adjustment is made to the chair, at 804. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user, as described above. The information received by the cloud-based service can be utilized and compared to the parameter values for the individual user so that any personalized adjustments can be conveyed back to the product by way of the network. Examples of how this can be done are provided above.

Based on the user's interaction, a notification can also be generated that is personalized to the user at 806. Any suitable type of notification can be generated. For example, a remedial notification can be generated. Alternately or additionally, a diagnostic notification can be generated. The generated notification can then be conveyed to the user in either a locally-based manner or a remotely-based manner. Local-based notifications refer to those notifications that are generated and provided locally, such as by the user's computing device. Remotely-based notifications refer to those notifications that come from a remote source, such as a source that is accessible over a network such as the Internet.

Having considered a use case in association with a chair, consider now a use case associated with an adjustable seat, such as an airline seat.

Use Case—Adjustable Seat (Airline Seat)

Figure 9:
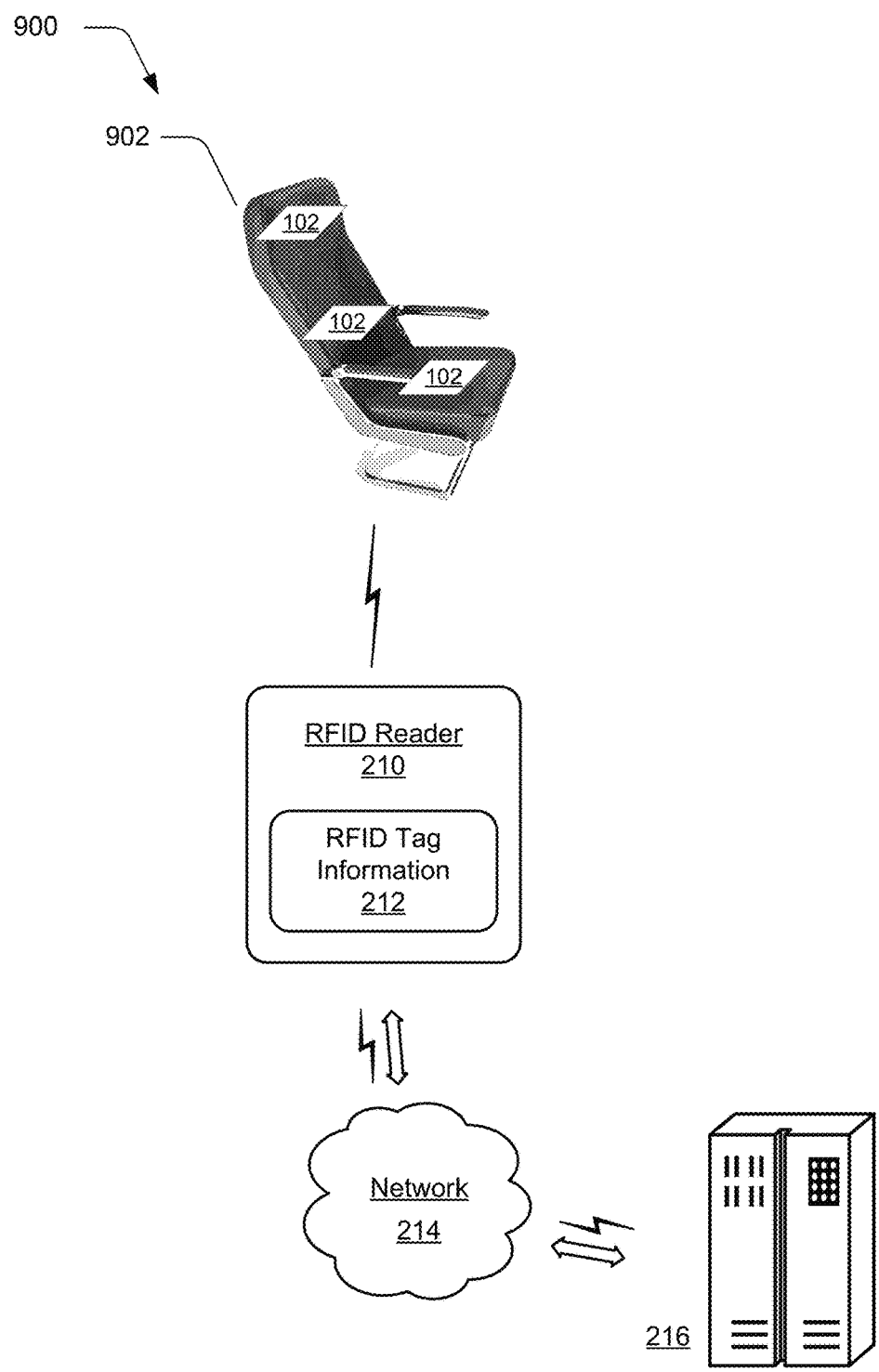
FIG. 9 illustrates an example system in which embodiments of wireless system-based personalized adjustments and monitoring can be implemented.

FIG. 9 illustrates an example system, generally at 900, that includes a product in the form of an adjustable seat 902, such as an airline seat. Adjustable seat 902 includes an array of RFID tags 102 (FIGS. 1 and 2) that are mounted thereon. System 900 also includes an RFID reader 210 having RFID tag information 212 as described above in relation to FIG. 2. In one or more embodiments, system 900 also includes a network 214 and one or more servers 216, as described above in relation to FIG. 2. The servers can, in some embodiments, implement a cloud-based service.

In the illustrated and described embodiment, each of the RFID tags 102 includes one or more sensors that monitor a user's interaction with the seat 902. As noted above, the sensors can include any suitable type of sensors such as, by way of example and not limitation, force sensors, temperature sensors, position sensors, timing sensors, and the like.

When a user interacts with the seat, the sensors gather information associated with the user's interaction. In some instances, the user's interaction may include sitting in the seat for a period of time, reclining the seat, and the like. The sensors, in turn, can gather information associated with the period of time the user has sat in the seat, the reclining angle of the seat, the force being exerted on the seat, the seat contour or the user's pressure contour, and the like. This gathered information represents environmental parameters describing the user's interaction with the seat 902. This information can then be used to make personalized adjustments to the seat that fit the user.

For example, consider an in-flight use case scenario where the seat 902 is in an airliner in flight. Assume that the user has a profile that describes parameter values associated with the seat 902 such as, by way of example and not limitation, chair rigidity, reclining ranges, and the like. In this case, an individual may have defined the parameter values for the user based on a rehabilitation strategy or a strategy designed to avoid injury or undesirable conditions such as blood pooling in the legs and lack of movement. As a user interacts with the seat, the user may environmentally impact the seat in a manner which creates environmental parameters that exceed the environmental parameter values defined by the individual. If such is the case, based on the monitored environmental parameters, personalized adjustments can be made to the seat 902 or notifications or warnings can be issued. So, for example, if the user has sat in the seat for a long period of time, such information can be used to cause a personalized adjustment to be made to the seat such as by inflating the seat cushion or back cushion to bring the inflation factor back within the defined environmental parameter values. Alternately or additionally, if the user has sat in the seat for a prolonged period of time, a notification might be automatically issued to inform the user that they should stand, stretch, and walk around in the airliner's cabin.

Adjustments can be locally-based or remotely-based as described above. As another example, the user may be convalescing from a back or neck injury and, accordingly, an orthopedic professional may have defined environmental parameter values that describe desired reclining ranges of the seat 902 or maximum sitting durations. The user may, in the course of interacting with the seat 902 adjust the seat to a recline mode that is outside of the defined reclining range. In this case, the environmental parameters associated with the user's interaction can be monitored and personalized adjustments can be made to the seat to bring the seat back within the environmental parameter values that have been defined for the seat's reclining range. Again, these adjustments can be locally-based or remotely-based.

As noted above, personalized adjustments to the seat 902 can be made on a local or remote basis, as described above. When personalized adjustments to the seat are locally-based, the environmental parameters monitored by the RFID tags 102 can be used to make adjustments without necessarily communicating the environmental parameters and other information to a remote source, such as a cloud-based service. Alternately, when personalized adjustments to the seat are remotely-based, the environmental parameters can be used to make adjustments by communicating the environmental parameters and other information to a remote source, such as a cloud-based service supported by server

216. The cloud-based service may employ a database that includes a number of different user profiles. Each user profile includes information about a particular user, such as environmental parameter values that have been assigned to or otherwise associated with an individual user. When the cloud-based service receives the environmental parameters from the RFID tag or tags, the cloud-based service can cross reference the database, or another source such as a human individual, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the RFID tags and cause personalized adjustments to be made to the seat. This can include, by way of example and not limitation, communicating information back to a seat-controlling system that can automatically cause seat adjustments to be made in a manner that are personalized to the user.

Example method 1000 is described with reference to FIG. 9 in accordance with implementations of RFID tag-based personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
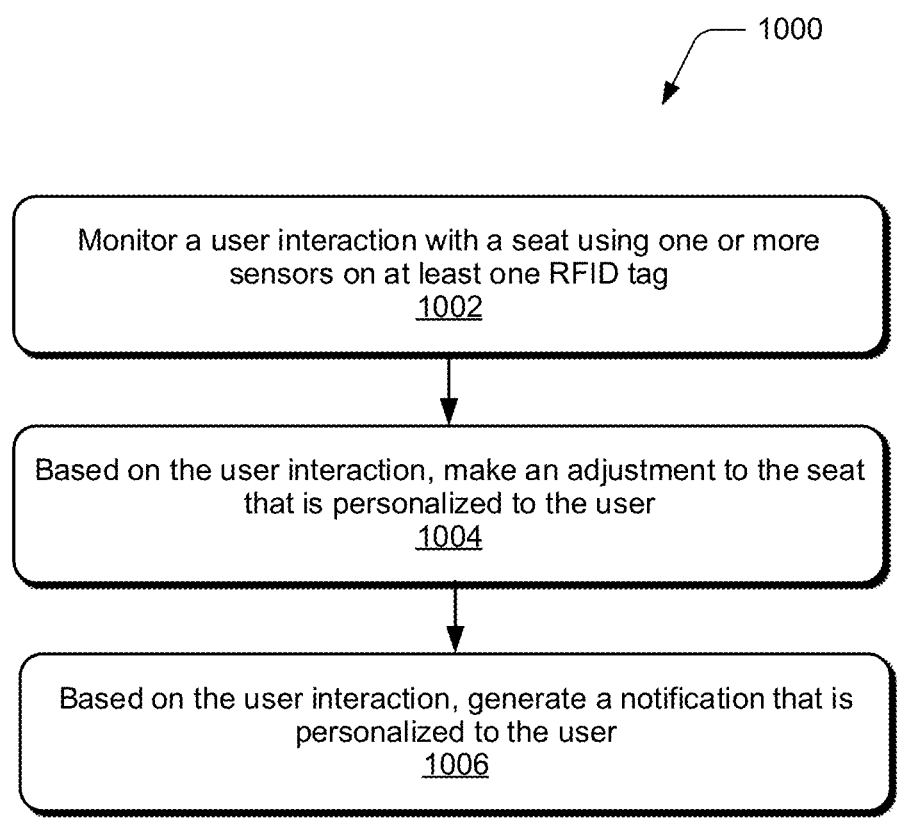
FIG. 10 illustrates an example method in accordance with one or more embodiments.

FIG. 10 illustrates an example method 1000 of RFID tag-based monitoring and personalized adjustments as described herein, and is generally described with reference to systems described in FIGS. 1-3 and 9. The order in which the method is described is not intended to be construed as a limitation, and any number or combination of the described method operations can be performed in any order to perform a method, or an alternate method.

At 1002, a user's interaction with a seat is monitored using one or more sensors on one or more RFID tag. Any suitable type of user interaction can be monitored, examples of which are provided above. In addition, any suitable type of sensors can be utilized to monitor a user's interaction. Examples of suitable sensors are provided above. In the illustrated and described embodiment, the sensor or sensors on the RFID tag gather information associated with the user's interaction with the seat. The information that is gathered can be associated with environmental parameters describing the user's interaction with the seat as described above.

Based on the user's interaction, an adjustment is made to the seat, at 1004. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user, as described above. The information received by the cloud-based service can be utilized and compared to the parameter values for the individual user so that any personalized adjustments can be conveyed back to the product by way of the network. Examples of how this can be done are provided above.

Based on the user's interaction, a notification can also be generated that is personalized to the user at 1006. Any suitable type of notification can be generated. For example, a remedial notification can be generated. Alternately or additionally, a diagnostic notification can be generated. The generated notification can then be conveyed to the user in either a locally-based manner or a remotely-based manner. Local-based notifications refer to those notifications that are generated and provided locally, such as by the user's computing device. Remotely-based notifications refer to those notifications that come from a remote source, such as a source that is accessible over a network such as the Internet.

Having considered a use case in association with a seat, consider now a use case associated with a pair of shoes.

Use Case—Shoes

Figure 11:
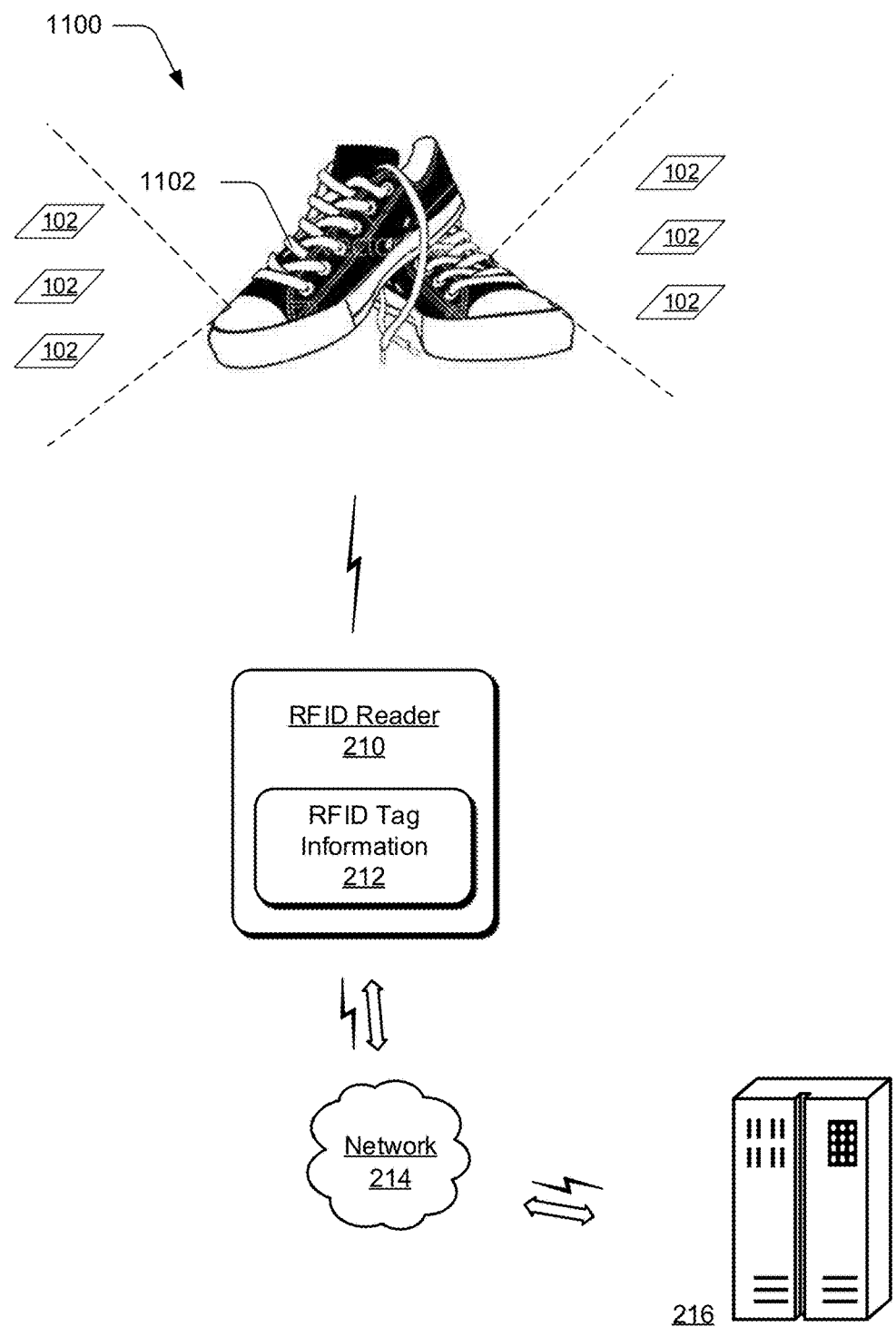
FIG. 11 illustrates an example system in which embodiments of wireless system-based personalized adjustments and monitoring can be implemented.

FIG. 11 illustrates an example system, generally at 1100, that includes a product in the form of a pair of shoes 1102. Each shoe of the pair of shoes 1102 includes an array of RFID tags 102 (FIGS. 1 and 2) that are mounted thereon. The array of RFID tags 102 can be mounted on any suitable part of the shoes including, by way of example and not limitation, the sole of the shoe. System 900 also includes an RFID reader 210 having RFID tag information 212 as described above in relation to FIG. 2. In one or more embodiments, system 1100 also includes a network 214 and one or more servers 216, as described above in relation to FIG. 2. The servers can, in some embodiments, implement a cloud-based service.

In the illustrated and described embodiment, each of the RFID tags 102 includes one or more sensors that monitor a user's interaction with the shoes. As noted above, the sensors can include any suitable type of sensors such as, by way of example and not limitation, force sensors, temperature sensors, position sensors, timing sensors, pedometers, and the like.

When a user interacts with the shoes, the sensors gather information associated with the user's interaction. In some instances, the user's interaction may include walking, running, jumping, exercising, participating in sports, and the like. The sensors, in turn, can gather information associated with the user's interaction. This gathered information represents environmental parameters describing the user's interaction with the shoes 1102. This information can then be used to make personalized adjustments to the shoes that fit the user, e.g., by causing the shoe cushion to inflate automatically. Alternately or additionally, this information can be used to make recommendations to a user or to generate notifications to third parties, such as a trainer or physical therapist.

For example, consider a user who is wearing shoes in which the RFID tags are mounted. As the user walks or runs, the sensors can detect the user's gait and various pressure points associated with the steps that the user is taking. This information can be gathered by the sensors on the RFID tags and read by the RFID reader 210. The information can be reported to a third party, such as a cloud service offering physical therapy services, by way of network 214. The physical therapist may then use the information as part of a diagnostic tool to assist the user. In addition, the sensors may indicate that the user is climbing a set of stairs by sensing a situation where force is alternately applied to the individual shoes. Using this information, a physical therapist may recommend a different stair climbing technique in the event the user is climbing the stairs in an inefficient or potentially injurious manner. This recommendation can be conveyed back to the user by way of network 214 and displayed for the user on an associated computing device.

Adjustments can be locally-based or remotely-based as described above. When personalized adjustments are locally-based, environmental parameters monitored by the RFID tags 102 can be used to make adjustments without necessarily communicating the environmental parameters and other information to a remote source, such as a cloud-based service. Alternately, when personalized adjustments are remotely-based, the environmental parameters can be used to make adjustments by communicating the environmental parameters and other information to a remote source, such as a cloud-based service supported by server 216. The cloud-based service may employ a database that includes a number of different user profiles. Each user profile includes information about a particular user, such as environmental parameter values that have been assigned to or otherwise associated with an individual user. When the cloud-based service receives the environmental parameters from the RFID tag or tags, the cloud-based service can cross reference the database, or another source such as a human individual, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the RFID tags and cause personalized adjustments to be made to the shoes. Alternately or additionally, notifications can be generated for the user as mentioned above.

Example method 1200 is described with reference to FIG. 11 in accordance with implementations of RFID tag-based personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 12:
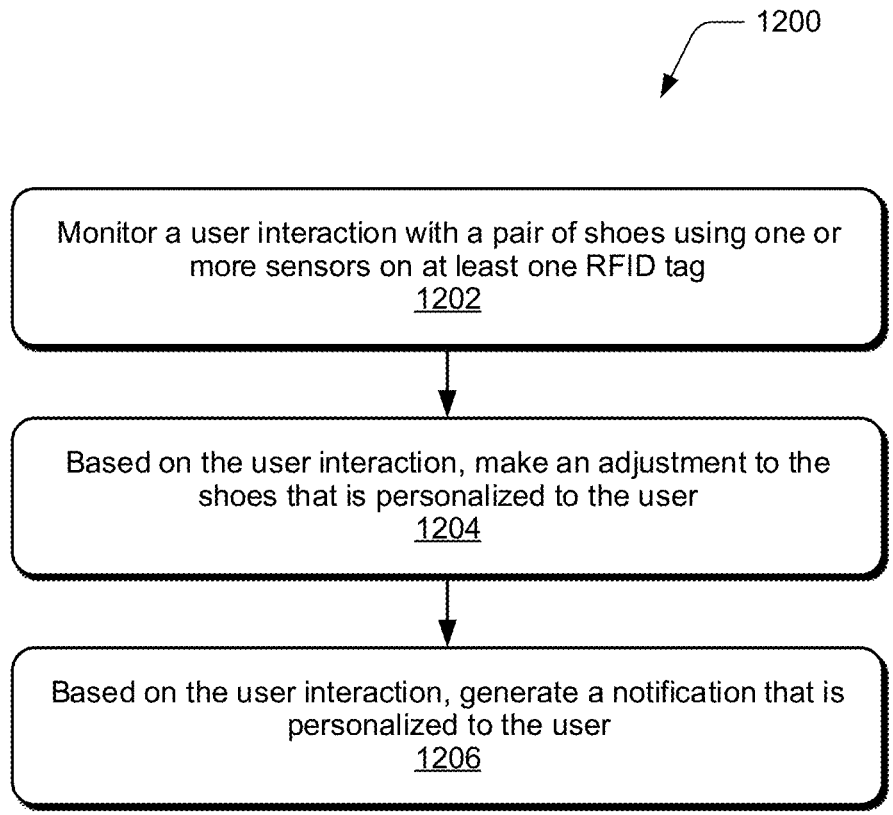
FIG. 12 illustrates an example method in accordance with one or more embodiments.

FIG. 12 illustrates an example method 1200 of RFID tag-based personalized adjustments as described herein, and is generally described with reference to systems described in FIGS. 1-3 and 11. The order in which the method is described is not intended to be construed as a limitation, and any number or combination of the described method operations can be performed in any order to perform a method, or an alternate method.

At 1202, a user's interaction with a pair of shoes is monitored using one or more sensors on one or more RFID tag. Any suitable type of user interaction can be monitored, examples of which are provided above. In addition, any suitable type of sensors can be utilized to monitor a user's interaction. Examples of suitable sensors are provided above. In the illustrated and described embodiment, the sensor or sensors on the RFID tag gather information associated with the user's interaction with the shoes. The information that is gathered can be associated with environmental parameters describing the user's interaction with the shoes as described above.

Based on the user's interaction, an adjustment is made to the shoes, at 1204. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user, as described above. The information received by the cloud-based service can be utilized and compared to the parameter values for the individual user so that any personalized adjustments can be conveyed back to the product by way of the network. Examples of how this can be done are provided above.

Based on the user's interaction with the shoes, a notification is generated that is personalized to the user at 1206. Any suitable type of notification can be generated. For example, a remedial notification can be generated such as "Your gait is causing unnecessary stress on your knees and hips. We recommend decreasing your gait by about 2 inches." Alternately or additionally, diagnostic notification can be generated such as "It appears that the manner in which you are climbing stairs favors your left leg. If you are experiencing knee pain, you should make an appointment to ankles and knees checked."

Having considered a use case in association with a pair of shoes, consider now a use case associated with compression socks.

Use Case—Compression Socks

Figure 13:
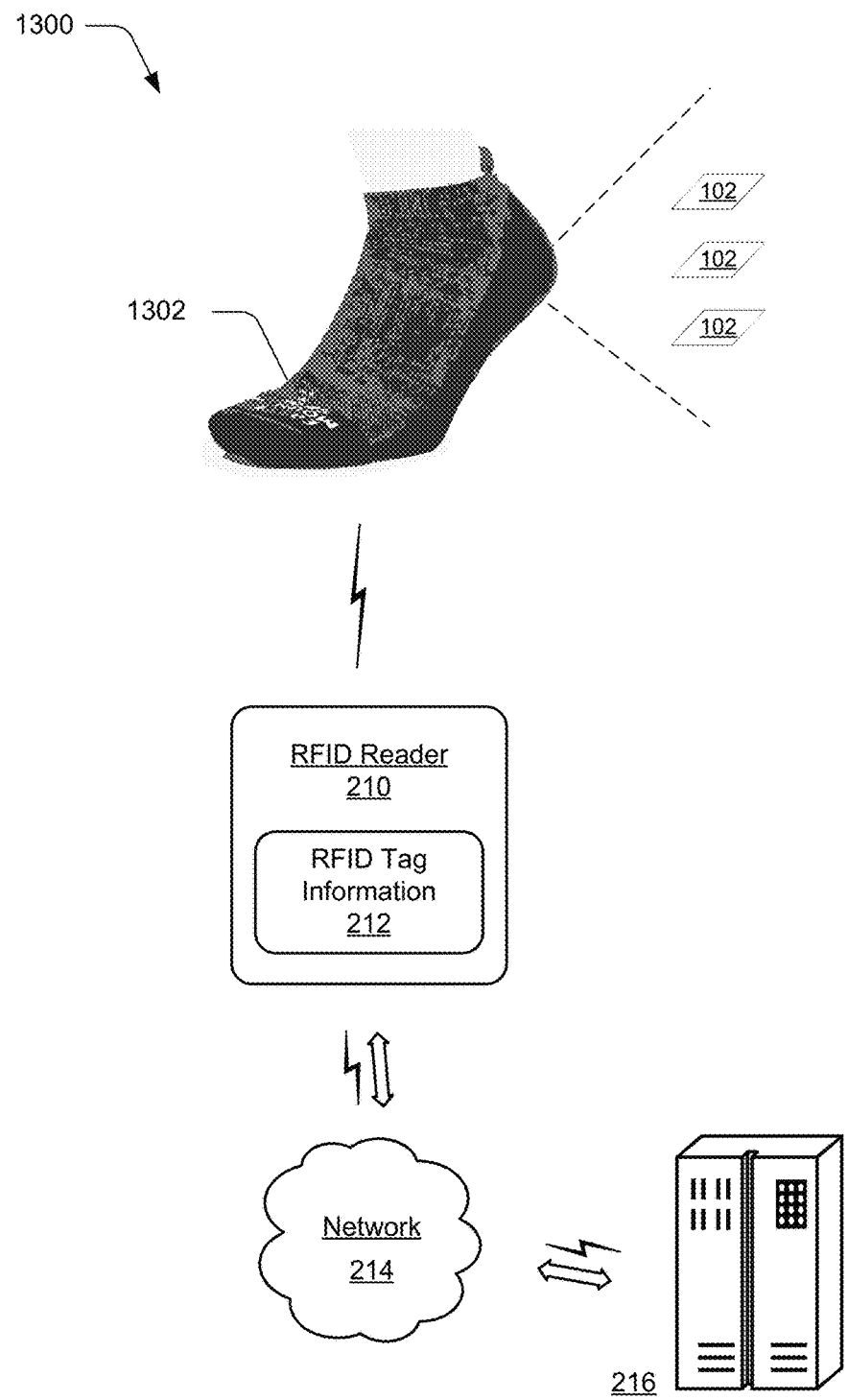
FIG. 13 illustrates an example system in which embodiments of wireless system-based personalized adjustments and monitoring can be implemented.

FIG. 13 illustrates an example system, generally at 1300, that includes a product in the form of a compression sock 1302 that forms a pair of compression socks. Each sock 1302 includes an array of RFID tags 102 (FIGS. 1 and 2) that are mounted thereon. The array of RFID tags 102 can be mounted on any suitable part of the sock. System 1300 also includes an RFID reader 210 having RFID tag information 212 as described above in relation to FIG. 2. In one or more embodiments, system 1100 also includes a network 214 and one or more servers 216, as described above in relation to FIG. 2. The servers can, in some embodiments, implement a cloud-based service.

In the illustrated and described embodiment, each of the RFID tags 102 includes one or more sensors that monitor a user's interaction with the socks. As noted above, the sensors can include any suitable type of sensors such as, by way of example and not limitation, force sensors, temperature sensors, position sensors, timing sensors, pedometers, and the like.

When a user interacts with the socks, the sensors gather information associated with the user's interaction. In some instances, the user's interaction may include walking, running, jumping, exercising, participating in sports, sitting, and the like. The sensors, in turn, can gather information associated with the user's interaction. This gathered information represents environmental parameters describing the user's interaction with the sock 1302. This information can then be used to make personalized adjustments to the socks that fit the user, e.g., loosening or tightening the socks automatically. Alternately or additionally, this information can be used to make recommendations to a user or to generate notifications to third parties, such as a trainer or physical therapist.

For example, consider a user who is wearing compression socks in which the RFID tags are mounted. If the user is sitting for an extended period of time, the sensors can detect this situation. The information pertaining to the user's engagement can be gathered by the sensors on the RFID tags and read by the RFID reader 210. The information can be reported to a third party, such as a cloud service offering physical therapy services, by way of network 214. The physical therapist may then use the information as part of a diagnostic tool to assist the user. Using this information, a physical therapist or a monitoring service may recommend that the user stand and walk for a period of time to prevent blood from pooling in their feet and associated swelling that goes along with it. This recommendation can be conveyed back to the user by way of network 214 and displayed for the user on an associated computing device.

Adjustments can be locally-based or remotely-based as described above. When personalized adjustments are locally-based, environmental parameters monitored by the RFID tags 102 can be used to make adjustments without necessarily communicating the environmental parameters and other information to a remote source, such as a cloud-based service. Alternately, when personalized adjustments are remotely-based, the environmental parameters can be used to make adjustments by communicating the environmental parameters and other information to a remote source, such as a cloud-based service supported by server 216. The cloud-based service may employ a database that includes a number of different user profiles. Each user profile includes information about a particular user, such as environmental parameter values that have been assigned to or otherwise associated with an individual user. When the cloud-based service receives the environmental parameters from the RFID tag or tags, the cloud-based service can cross reference the database, or another source such as a human individual, to ascertain whether the received environmental parameters are consonant with the environmental parameter values that have been assigned to or otherwise associated with an individual user. In an event that the received environmental parameters are not consonant with the environmental parameter values that have been assigned to or otherwise associated with individual user, the cloud-based service can communicate back to the RFID tags and cause personalized adjustments to be made to the compression socks. Alternately or additionally, notifications can be generated for the user as mentioned above.

Example method 1400 is described with reference to FIG. 13 in accordance with implementations of RFID tag-based personalized adjustments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 14:
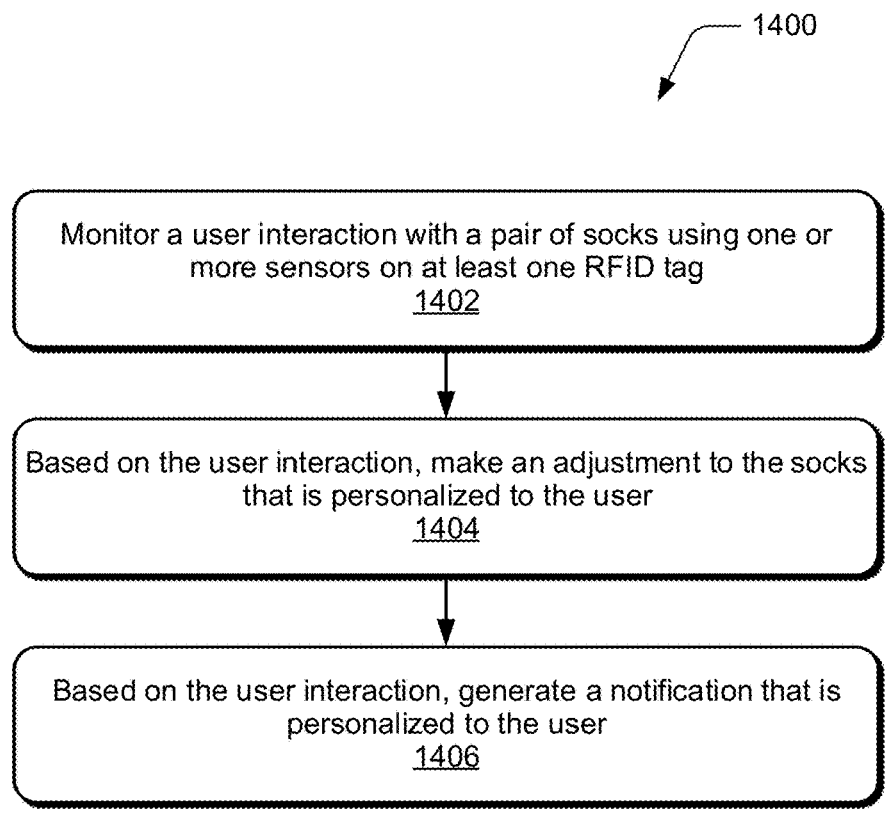
FIG. 14 illustrates an example method in accordance with one or more embodiments.

FIG. 14 illustrates an example method 1400 of RFID tag-based personalized adjustments as described herein, and is generally described with reference to systems described in FIGS. 1-3 and 13. The order in which the method is described is not intended to be construed as a limitation, and any number or combination of the described method operations can be performed in any order to perform a method, or an alternate method.

At 1402, a user's interaction with a pair of socks, e.g., compression socks, is monitored using one or more sensors on one or more RFID tag. Any suitable type of user interaction can be monitored, examples of which are provided above. In addition, any suitable type of sensors can be utilized to monitor a user's interaction. Examples of suitable sensors are provided above. In the illustrated and described embodiment, the sensor or sensors on the RFID tag gather information associated with the user's interaction with the socks. The information that is gathered can be associated with environmental parameters describing the user's interaction with the socks as described above.

Based on the user's interaction, an adjustment is made to the socks, at 1404. In the illustrated and described embodiment, the adjustment is personalized to the user. Personalized adjustments can be made in any suitable way. For example, in at least some embodiments, the personalized adjustments are made locally and are hence locally-based. Locally-based adjustments can be considered as adjustments that are made without necessarily communicating information, such as the environmental parameters mentioned above, to a remote source. Alternately or additionally, the personalized adjustments can be remotely-based, such as by being caused by a remote service such as a cloud-based service. In embodiments that include remotely-based personalized adjustments, the information gathered by the sensor or sensors can be conveyed by an RFID reader, by way of a suitably-configured network, to a remote source such as a cloud-based service. Along with the information gathered by the sensor or sensors, information associated with the user can also be conveyed to the remote source. This user information can come from an RFID tag that is worn by the user and may include, by way of example and not limitation, a unique user identifier that can enable a database lookup as described above and below. The database can include user profile information associated with the user. The user profile information can include environmental parameter values that have been assigned to or otherwise associated with the user, as described above. The information received by the cloud-based service can be utilized and compared to the parameter values for the individual user so that any personalized adjustments can be conveyed back to the product by way of the network. Examples of how this can be done are provided above.

Based on the user's interaction with the socks, a notification is generated that is personalized to the user at 1406. Any suitable type of notification can be generated. For example, a remedial notification can be generated such as "You have been stationary and seated for a prolonged period of time. Please stand up and move around."

Having considered a use case in association with a pair of socks, consider now embodiments in a tracking system having a wireless radio system can be used to monitor and guide people, such as helping guide people with prosthetic or injured body parts and where and how to treat and engage their injured body part.

Tracking System to Monitor and Guide a User

Today, people with injured body parts such as arms, legs, feet, and the like and/or people who receive prosthetic limbs often times not understand where and how much pressure or force to place on an injured body part or other body parts. For example, a physical therapist or trainer may instruct an injured person on how to rehabilitate an injured body part, but in reality, the physical therapist or trainer is often times not able to be present in person to monitor such activities. Therefore, an injured person may fail to follow the physical therapist's or trainer's instructions. By not following the prescribed instructions, the injured person may incorrectly implement the prescribed activities in a manner that is detrimental to their recovery, may cause further injury, and slow down the recovery process.

In various embodiments, a tracking system includes a wireless radio system which is useful in instructing users how to place force in the right places to facilitate recovery, rebuild strength, and/or use their injured limbs or their new prosthetics to their full potential. The system can do things such as count a user's repetitions, determine the amount of weight to put on a body part, and implement therapy scenarios to assist the user and guide the user on how to conduct rehabilitation activities. Various wireless sensors are employed by the wireless radio system in wearable articles that can be worn on the hands and feet. Wearable articles that can be worn on the hands and feet can include, by way of example and not limitation, exoskeleton wearables, stickers, socks, and the like. In the example below, gloves and shoes are used for example purposes only, to monitor and track the user's movement. For example, through the use of force sensors that are placed in the palm and fingers of a glove, or the soles of a shoe, information can be gathered and used to guide the user in rehabilitation activities. The sensors can include any suitable sensors such as force sensors, accelerometers, gyroscope sensors, and various other wireless sensors. The gathered information can be processed and analyzed to produce notifications that can guide individuals on how to conduct the correct training, how to place the right amount of force in the right locations to facilitate recovery, how to rebuild strength and/or enable the use of the injured body part or new prosthetic to its full potential. The tracking system can do such things as count the number of repetitions performed by the user, determine the amount of weight to place on an injured body part or prosthetic, ascertain the correct angles or disposition of the user during exercise or other rehabilitative activities, and convey such information to the user to provide feedback to improve the user's performance.

In at least some embodiments, the tracking system and wireless radio system can also be used in a predictive manner to prevent injury by analyzing the movement of the user and advising them on any modifications that should be implemented. For example, the user's hand motion and hand movement can be monitored to ascertain whether the user is at risk for carpal tunnel syndrome. If so, the user can be advised to implement preventative measures to avoid or mitigate their carpal tunnel risk.

Consider now a tracking system in accordance with one or more embodiments.

In various embodiments, glove-based and/or shoe-based tracking systems are described, such as for a pair of wireless, sensor-based gloves or shoes that are implemented with force sensors, as well as other sensors, integrated in the palm and/or in the fingers of the gloves, and the soles of the shoes. The pair of gloves are wearable by a user who grasps and moves items such as weights, and performs other exercises. A tracking system is implemented in at least one glove of the pair of gloves, as well as at least one shoe of the pair of shoes. The pair of gloves and shoes are designed to be worn by a person who exercises by lifting weights in a gym or performs other exercises.

The tracking system includes the force sensors, as well as other sensors, in the gloves and shoes to register a force placed upon the gloves and shoes. The force sensors in the glove can include a palm force sensor, or sensors, as well as finger force sensors. The force sensors in the shoes can include sole-based sensors, tongue based sensors, side sensors and the like.

The tracking system also includes tracking software that can estimate the weight of an item based on the force of the grasp on the item. The tracking system may also include a motion sensor to sense motion and directional movement of the gloves and shoes. The tracking software can determine how an item or how the user's hand is moved based on the motion of the glove, and how the foot and leg are moved based on movement of the shoe. The tracking software can also determine the weight of an item based on the force of the grasp on the item in combination with a speed of the motion of the glove. Further, the tracking system may be implemented in both gloves of the pair of gloves, and the tracking system includes a wireless radio system to synchronize tracking data between the tracking systems of the pair of gloves and the shoes. The tracking software can then determine a weight distribution of the weight of the item based on the force of the grasp on the item registered by each of the respective gloves.

In aspects of glove-based and shoe-based tracking, the tracking software of the tracking system can determine physical characteristics of the user who wears the pair of gloves and/or shoes, such as a lifting technique of the user to lift and move an item, walking technique, running technique, climbing technique, cardio exercise technique and the like. The physical characteristics of the user can also include a distance traveled over a time duration, such as the distance walked or run by a user.

In one or more embodiments, the tracking software monitors the user to produce real-time data that is analyzed for the purpose of providing feedback to the user to guide the user to ensure that the user is employing proper and sound technique in performing exercises and rehabilitation movements. The user feedback can advise the user on where and how to place additional force, proper posture and positioning, form, and the like. By advising and guiding the user through correct techniques that employ proper movement, a user's rehabilitation, recovery, and strength recovery can be greatly facilitated. In addition, the risk of injury can be reduced by providing real-time feedback while the user is performing exercises and rehabilitation movements.

While features and concepts of glove-based and shoe-based tracking can be implemented in any number of different devices, systems, environments, and/or configurations, embodiments of glove-based weight tracking are described in the context of the following example devices, systems, and methods.

Figure 15:
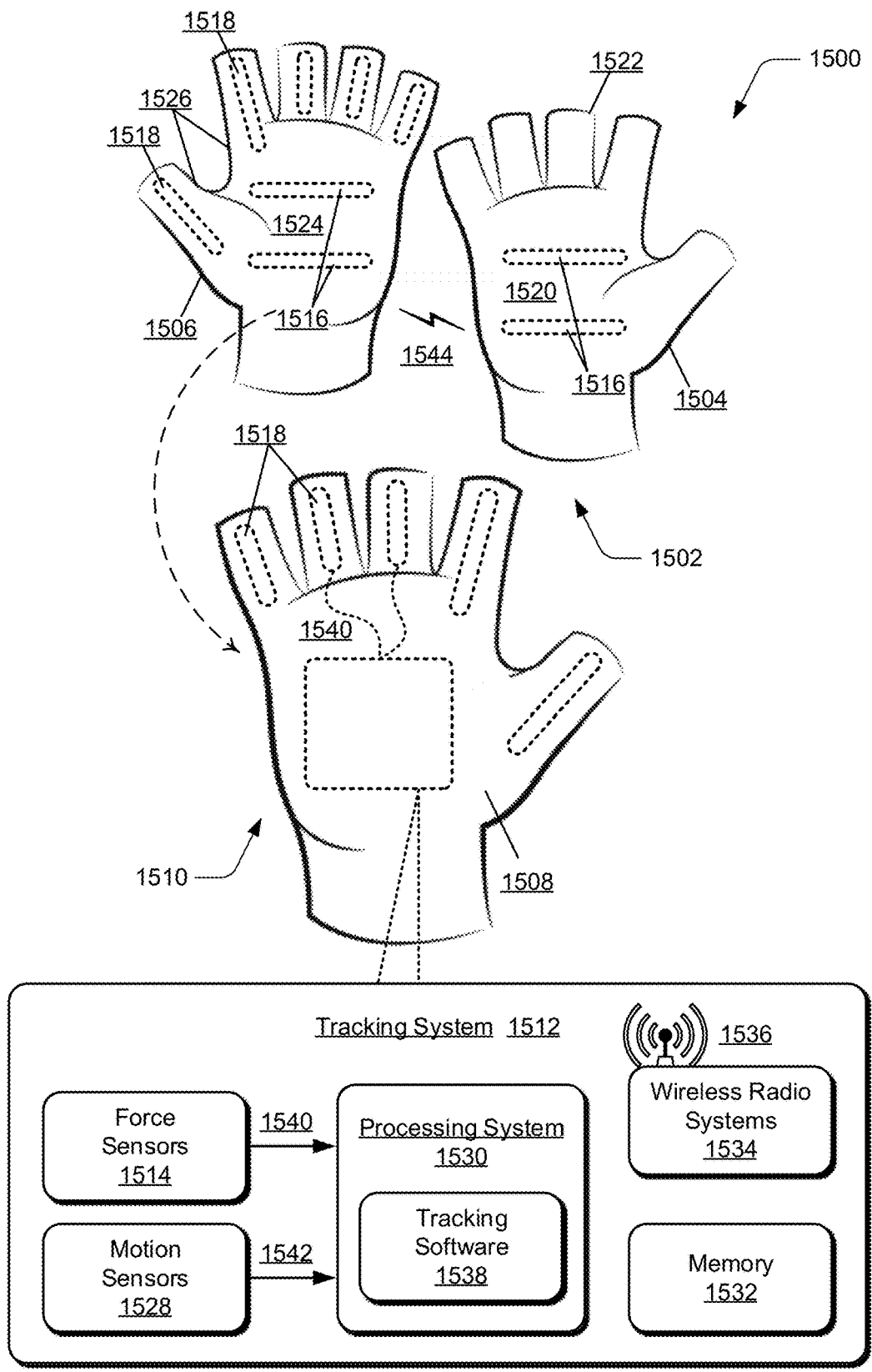
FIG. 15 illustrates an example system in which embodiments of wireless system-based personalized adjustments and monitoring can be implemented.

FIG. 15 illustrates an example system 1500 in which embodiments of glove-based and/or shoe-based tracking can be implemented. While the example embodiment is described in detail in connection with a pair of gloves, the same or similar system can be employed in the context of shoes, such as the shoes shown and described in FIG. 11.

The example system 1500 includes a pair of gloves 1502 that are a right-hand glove 1504 and a left-hand glove 1506, as viewed from the palm side of the gloves. The back 1508 of the left-hand glove 1506 is also shown at 1510 with the glove flipped over. The pair of gloves 1502 are designed to be worn by a user who grasps and moves items, such as person who exercises by lifting weights in a gym, or performs rehabilitation movements without necessarily lifting weights.

As noted above, a tracking system 1512 integrated with the gloves 1502 can detect, sense, and/or determine various characteristics of items that the user moves while wearing the gloves, as well as various physical characteristics related to the user moving the items or performing rehabilitation movements without necessarily moving items. For example, the item characteristics that can be determined about an item include the weight and/or size of the item.

The physical characteristics related to the user moving an item, or items, that can be determined include a proper lifting form and technique when the user picks up and moves an item, repetitive motions, and an indication of the user having an injury relating to lifting and moving items. The physical characteristics can also include determining the distance traveled over a time duration by a user handling items, efficiencies of lifting and movement, as well as safety concerns and various other physical characteristics related to a user moving an item, or items.

The tracking system 1512 can be implemented in one or both gloves of the pair of gloves 1502. Although FIG. 15 generally illustrates the tracking system implemented in the left-hand glove 1506, the tracking system 1512 may be implemented in the right-hand glove 1504, or implemented in both of the gloves of the pair of gloves. Unless specifically indicated, the term "glove" as used herein applies to either of the right-hand glove 1504, the left-hand glove 1506, or both gloves of the pair of gloves 1502.

The tracking system 1512 includes a force sensor 1514, or force sensors, integrated in the gloves 1502 to register a force of the grasp on an item when a user picks up and moves the item. The force sensors 1514 in a glove can include a palm force sensor 1516, or sensors, as well as finger force sensors 1518. For example, the right-hand glove 1504 is shown having two palm force sensors 1516 integrated in the palm region 1520 of the glove. Although the right-hand glove 1504 is shown having the two palm force sensors 1516, a glove may be implemented with one palm force sensor 1516 of the tracking system 1512, or with more than two palm force sensors. In an implementation, a glove may include only a palm force sensor 1516, or sensors, of the tracking system. The fingers 1522 of the right-hand glove 1504 do not include finger force sensors in this example.

The left-hand glove 1506 is also shown having two palm force sensors 1516 integrated in the palm region 1524 of the glove. Additionally, the fingers 1526 of the left-hand glove 1506 include the finger force sensors 1518. As generally described herein, the thumb of a glove is referred to collectively as one of the fingers 1526 of the glove. Further, although all of the fingers 1526 of the left-hand glove 1506 are shown having an integrated finger force sensor 1518, any number of the fingers 1526 of the glove may or may not include a finger force sensor.

In implementations, the tracking system 1512 can include a motion sensor 1528, or motion sensors, to sense motion of the glove as the user picks up and moves an item while wearing the pair of gloves 1502, or conducts some physical training movement or rehabilitation movement without necessarily moving an item. The tracking system 1512 may be implemented with one or various motion sensors 1528, such as a gyroscope, an accelerometer, and/or other types of motion sensors to sense motion of the glove in which the tracking system 1512 is integrated.

Generally, the tracking system 1512 can be implemented with computing and/or electronic device components such as a processing system 1530 (e.g., one or more processors), a memory 1532, and any number and combination of various components as further described with reference to the example device shown in FIG. 18. Additionally, the tracking system 1512 includes a power source, such as a battery, to power the various components of the tracking system.

Further, the tracking system 1512 can include various, different wireless radio systems 1534, such as for Wi-Fi, Bluetooth™, Mobile Broadband, LTE, Near Field Communication (NFC), RFID tag-based systems (such as those described above), or any other wireless radio system or format for communication via respective wireless networks (e.g., the wireless network as described with reference to FIG. 2). Generally, the tracking system 1512 implements the wireless radio systems 1534 that each include a radio device, antenna 1536, and chipset that is implemented for cellular, wireless, and/or other network communication with other devices, networks, and services. A wireless radio system 1534 can be configured to implement any suitable communication protocol or standard.

The tracking system 1512 includes tracking software 1538 that can be implemented as a software application or module, such as computer-executable software instructions that are executable with a processor (e.g., with the processing system 1530). Similarly, the tracking system 1512 may also include an operating system as a software application. The tracking system 1512 and/or the operating system can be stored on computer-readable storage memory (e.g., the memory 1532), such as any suitable memory device or electronic data storage implemented with the tracking system.

In aspects of glove-based and shoe-based tracking, the tracking software 1538 receives force sensor inputs 1540 from the force sensor or sensors 1514, and can receive motion sensor inputs 1542 from the motion sensor or sensors 1528. The tracking software 1538 is implemented to determine the weight of an item based on the force of the grasp on the item by the user who picks up and moves the item. The tracking software 1538 is also implemented to determine motion, motion direction, and from this, derive information associated with a user's form and performance of exercise-related movements. Generally, for a heavier weighing item, an increased force will be registered by the force sensors 1514 as the user exerts more pressure of a grasping force to hold and pick up the item. Conversely, for a lighter weighing item, less of a force will be registered by the force sensors 1514 as the user applies less pressure of a grasping force to pick up the item. As used herein, the terms "heavier" and "lighter" with reference to an item's weight, as well as "more" and "less" with reference to force applied, are merely relative terms used to illustrate how the grasping force of a user who picks up and moves the item may correlate to a weight of the item.

Further, the tracking software 1538 can be implemented to determine the weight of an item based on the force of the grasp on the item in combination with a speed of the motion of the glove. Generally, for a heavier weighing item, the speed of the motion of the glove is likely to be slower than for a lighter weighing item that the user can move easily and quicker. As used herein, the terms "slower" and "quicker" with reference to the speed of motion as an item is moved are merely relative terms used to illustrate how the speed of motion may correlate to a weight of the item as a user picks up and moves the item.

Additionally, as noted above, the tracking system 1512 may be implemented in both gloves of the pair of gloves 1502, and the wireless radio system 1534 in each of the respective tracking systems 1512 for the right-hand glove 1504 and the left-hand glove 1506 can be utilized to synchronize tracking data and the timing of data reporting between the tracking systems of the pair of gloves (at 1544). The tracking data can include the force sensor inputs 1540, the motion sensor inputs 1542, and any other tracking data related to the weight and motion determinations of an item that a user picks up and moves while wearing the pair of gloves 1502. Such can also be done for movement and motion determinations in which a user does not necessarily move an item, but rather performs a training exercise or rehabilitation movement.

The tracking software 1538 can then determine a weight distribution of the weight of the item based on the force of the grasp on the item registered by each of the tracking systems 1512 integrated in the respective left-hand and right-hand gloves. Similarly, the tracking software 1538 can determine which side (e.g., as an arm and hand combination) a user favors or uses more often based on the force distribution applied to grasp the item with each of the respective left-hand and right-hand gloves. A user may favor or limit the use of one side (e.g., an arm and hand combination) or the other, indicating that the user may have an injury.

In aspects of glove-based and shoe-based tracking, the tracking software 1538 of the tracking system 1512 can also be implemented to determine physical characteristics of the user who wears the pair of gloves 1502 or shoes. The physical characteristics of the user can include a lifting technique of the user to lift and move an item, or items, upper extremity movement techniques and characteristics such as arm, hand, and finger movement, lower extremity movement techniques and characteristics such as foot and leg movement. The physical characteristics of the user may also include a determination that the motion is a repetitive motion for a number of repetitions, such as by a user who lifts weights in a gym for exercise. The tracking software 1538 can then correlate the repetitive motion with an exercise, such as based on a database that correlates particular motions with respective exercises.

The tracking software 1538 can also generate user feedback as any type of audio or visual feedback that indicates a proper lifting technique of an item (e.g., weights in a gym) or movement in general based on information received from the various sensors. The tracking software 1538 can determine the exercise performed for the weight that a user lifts, count the user's reps, and provide user feedback related to the user's lifting form, technique, and any type of other user feedback related to the determined exercise, such as feedback on the user's movement when the user moves without necessarily lifting an item. As noted above, the tracking software 1538 may detect an indication of the user having an arm or hand injury if the user favors or limits the use of one side (e.g., an arm and hand combination) or the other. This information can also be provided as user feedback, not only to the user, but to health and wellness professionals that monitor job site activities and user efficiencies. Based on a rehabilitation scenario, by monitoring the user as they perform exercise movements, feedback can be provided in terms of how to apply more or different force with respect to a particular exercise, how to position or change a position with respect to a particular exercise, how to adjust form and technique to ensure that the user makes the most out of their training and exercising.

In other aspects of glove-based and shoe-based tracking, the tracking software 1538 can be implemented to determine a physical characteristic of a user as the distance traveled over a time duration, such as the distance walked or run by a user.

Additionally, a wireless radio system 1534 of the tracking system 1512 can communicate tracking data to another, independent device that is in communication with the tracking system 1512 of the glove or shoe, or as implemented in both the left-hand and the right-hand gloves of the pair of gloves 1502 or shoes.

Figure 16:
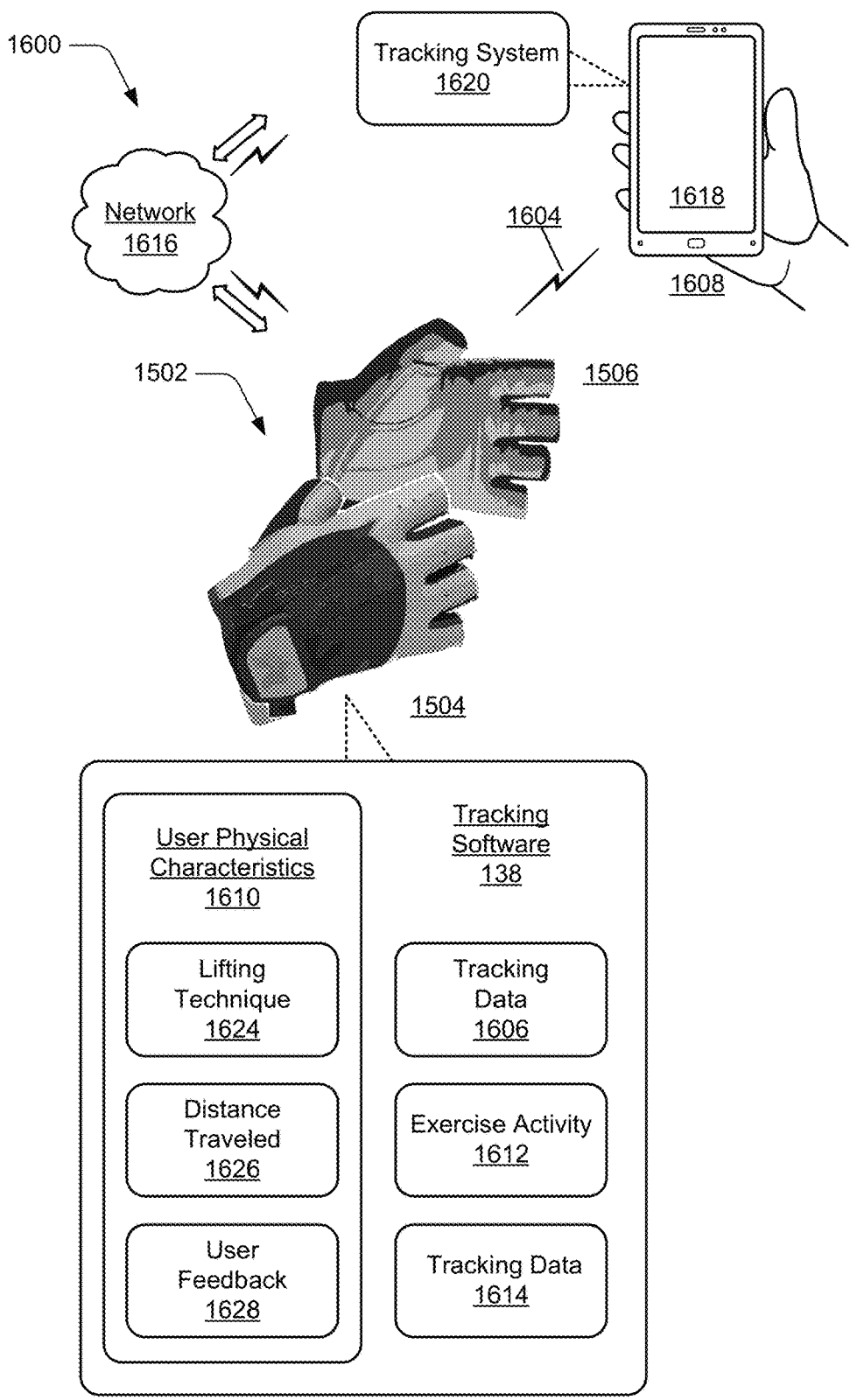
FIG. 16 illustrates an example system in which embodiments of wireless system-based personalized adjustments and monitoring can be implemented.

FIG. 16 further illustrates an example system 1600 for glove-based tracking as described above. The same or similar principles can be used for shoe-based tracking.

As noted above, a user can wear the pair of gloves 1502 (i.e., the right-hand glove 104 and the left-hand glove 106) while performing exercise or physical therapy routines. The tracking system 1512 (FIG. 15) that is integrated in the right-hand glove 1504, the left-hand glove 1506, or in both gloves of the pair of gloves 1502 includes the wireless radio system 1534 (FIG. 15), which can communicate (at 1604) the tracking data 1606 to another device 1608 that is in communication with the tracking system 1512 of the glove or gloves. The tracking data 1606 can include the user physical characteristics 1610, as determined by the tracking software 1638, as well as information related to exercise activity 1612. The tracking system 1512 can also communicate (at 1604) the exercise tracking data 1614 to the device 1608 that is in communication with the tracking system 1512 of the glove or gloves.

The device 1608 may be any type of mobile phone, tablet device, computing device (e.g., portable and desktop computers), consumer electronic device, or other type of computing and electronic device that is implemented to communicate, via a network 1616 (e.g., a Wi-Fi network) with the tracking system 1512 that is integrated in the glove or gloves 1502. The device 1608 can be implemented with various components, such as an integrated display device 1618, and with any number and combination of various components as further described with reference to the example device shown in FIG. 18.

The network 1616 generally represents any type of communication and data network, and any of the server and devices, as well as the tracking system 1512 described herein, can communicate via the network 1616 (or combination of networks), such as for data communication between the device 1608 and the tracking system 1512 that is integrated in one or both gloves of the pair of gloves 1502. The network 1616 can be implemented to include wired and/or wireless network. The network can also be implemented using any type of network topology and/or communication protocol, and can be represented or otherwise implemented as a combination of two or more networks, to include cellular networks, IP-based networks, and/or the Internet. The network 1616 may also include mobile operator networks that are managed by a network provider of a cellular network, a mobile network operator, and/or other network operators, such as a communication service provider, mobile phone provider, and/or Internet service provider.

The device 1608 can include a tracking system 1620 (e.g., a software application) to track data gathered by the gloves (or shoes). The tracking system 1620 at the device 1608 can receive the tracking data 1614 from the tracking system 1512 of the pair of gloves 1502. The tracking data 1614 can include information on the weights a user has lifted, the user's motion, and the like.

The device 1608 can also receive the user physical characteristics 1610 from the tracking system 1512 of the pair of gloves 1602. The user physical characteristics 1610 related to the user performing exercise, therapy or rehabilitation movements can include an indication of the lifting technique 1624 of the user (e.g., lifting a weight), the distance traveled 1626 over a time duration, and any other information such as user repetitions, form, motion, work performed, and the like. Physical characteristics can also include a determination of balance issues such as those indicating that the user may have an injury relating to lifting and moving items, efficiencies of lifting and movement (e.g., related to the lifting technique 1624), as well as safety concerns and various other physical characteristics related to a user performing exercise movement or rehabilitation motions.

The user physical characteristics 1610 can also include user feedback 1628 that is communicated to the device 1608 as any type of audio or visual feedback, such as for display on the integrated display device 1618 to indicate a proper lifting technique of an item (e.g., weights in a gym) based on the force of the grasp on the weights and the motion of the glove or gloves as the user picks up and moves the weights. In implementations, the user feedback 1628 may include any one or more of the tracking data 1606, the user physical characteristics 1610, information of the exercise activity 1612, the tracking data 1614, and any other type of user feedback. Additionally, the user feedback (to include any of the above described information) may be communicated to a cloud-based service via the network 1616, where the cloud-based service provides additional services, such as in the form of a virtual trainer, physical therapist, or orthopedist that shows proper lifting techniques (e.g., as a video or other images), or provides additional safety input for weight lifting, exercising, rehabilitation movement, and the like.

Having considered an example system in accordance with one or more embodiments, consider now example methods in accordance with one or more embodiments.

Example method 1700 is described with reference to FIGS. 15 and 16 in accordance with implementations of wireless system-based monitoring. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 17:
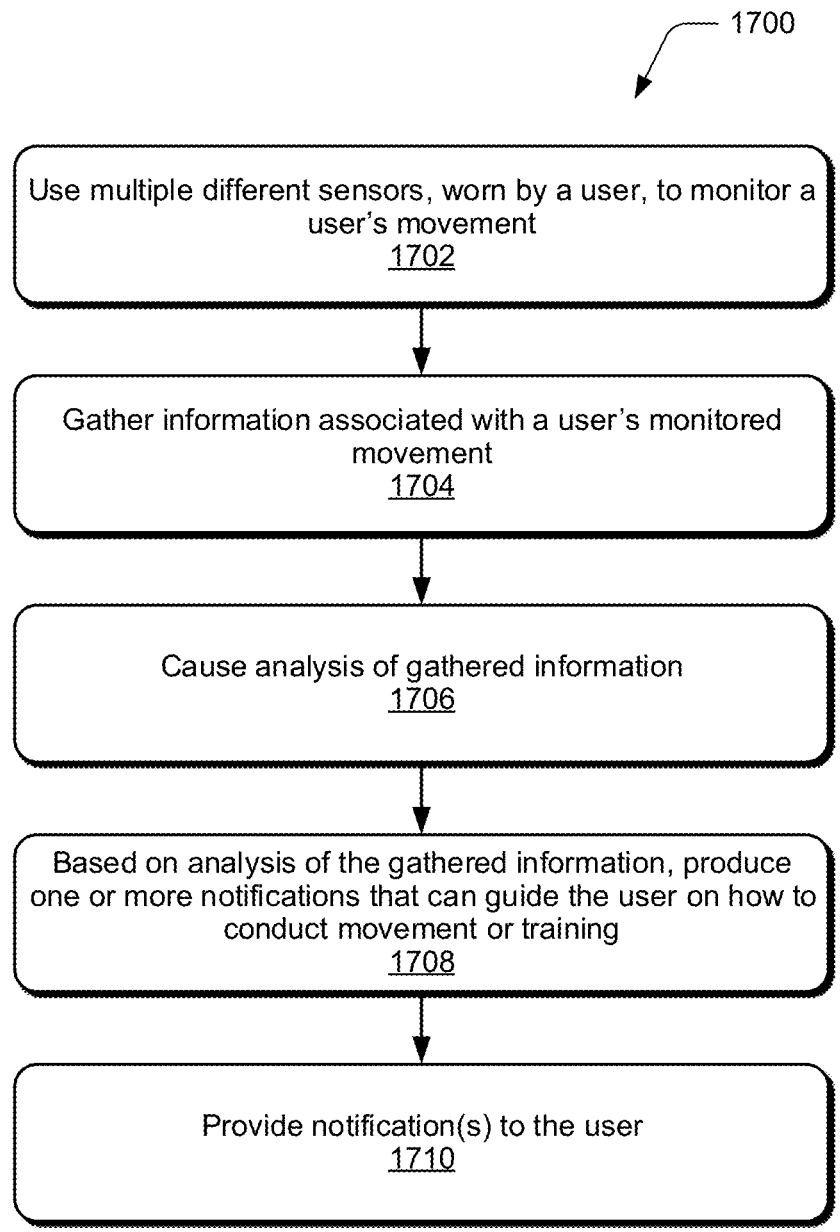
FIG. 17 illustrates an example method in accordance with one or more embodiments.

FIG. 17 illustrates an example method 1700 of wireless system-based monitoring as described herein, and is generally described with reference to systems described in FIGS. 15 and 16. The order in which the method is described is not intended to be construed as a limitation, and any number or combination of the described method operations can be performed in any order to perform a method, or an alternate method.

At 1702, multiple different sensors that are worn by a user are used to monitor a user's movement. The sensors can be worn in any suitable way such as, by way of example and not limitation, in one or more gloves one by the user, and one or more shoes worn by the user, and the like. In addition, any suitable type of user movement can be monitored including, by way of example and not limitation, movement associated with lifting weights, walking, running, exercising in other ways, performing rehabilitation movements or exercises, performing movements in connection with one or more prosthetics worn by the user, the number of repetitions performed by a user, and the like. As noted above, any suitable type of sensors can be employed including, by way of example and not limitation, force sensors, accelerometers, gyroscope sensors, pedometers, and various other wireless sensors.

At 1704, information associated with a user's monitored movement is gathered. The information may be gathered in any suitable way such as, by way of example and not limitation, a tracking system that is included in an article that is worn by the user such as a glove(s), shoe(s), and the like. At 1706, information that is gathered in association with a user's monitored movement is caused to be analyzed. Any suitable type of analysis can be performed, examples of which are provided above. In addition, analysis of the gathered information can take place in a locally-based fashion or in a remotely-based fashion. If locally-based, the analysis can take place on a local device associated with the different sensors. The local device can be one that is worn by the user or one that is maintained by the user, such as a handheld smart device. If remotely-based, the analysis can take place by transmitting the gathered information to a remote third-party service that is contactable by way of a suitably-configured network. Transmission of the gathered information can thus cause the analysis to be performed by the remote third-party service.

At 1708, based on the analysis of the gathered information, one or more notifications are produced that can guide the user on how to conduct movement or training. These notifications can be designed to guide the user and how to conduct the movement or training more efficiently, more safely, and more effectively. The notifications can be produced in any suitable way. For example, in at least some embodiments, the notifications can be locally produced, as by being produced by a locally worn or maintained device. Alternately or additionally, the notifications can be remotely produced, as by a remote third-party service that is contactable by way of a suitably-configured network, such as that described above.

At 1710, the notifications produced at 1708 are provided to the user. This can be done in any suitable way. For example, the notifications can be locally provided to the user. That is, if the notifications are locally produced, the notifications can simply be provided to the user by way of any suitable type of device. If, on the other hand, the notifications are remotely produced, the notifications can be transmitted to a local device and then, in turn, provided to the user.

In this manner, the user can be guided, in real time, on how to conduct their exercising, training, rehabilitation movement, and the like in a way that promotes safe and effective exercise and training.

Having considered various embodiments above, consider now an example device that can be utilized to implement the various embodiments above.

Figure 18:
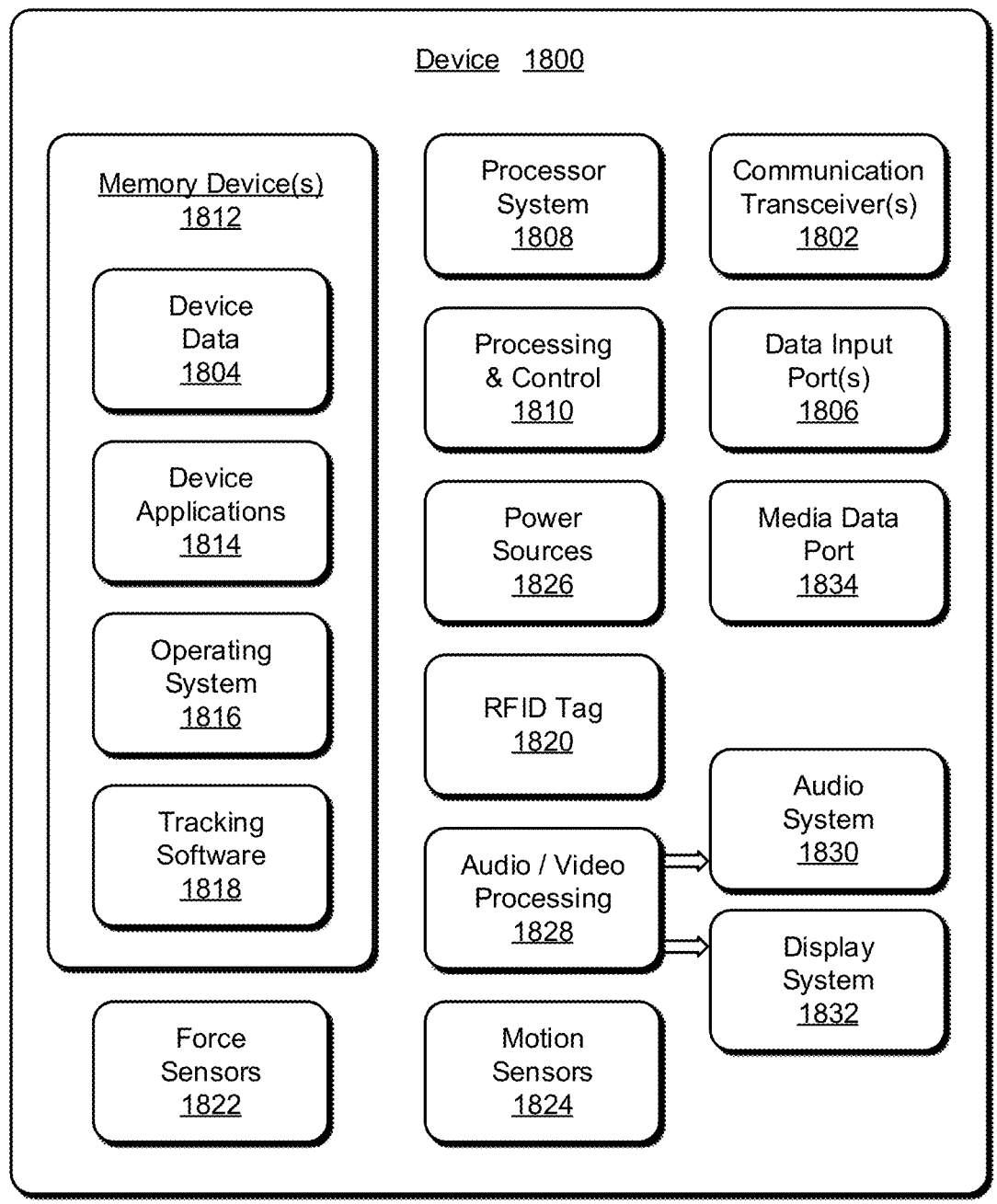
FIG. 18 illustrates various components of an example device that can implement embodiments of wireless system-based personalized adjustments and monitoring.

FIG. 18 illustrates various components of an example device 1800 in which the above-described embodiments can be implemented. The example device 1800 can be implemented as any of the devices described with reference to the above-described embodiments, such as any type of client device, mobile phone, tablet, computing, communication, entertainment, gaming, media playback, and/or other type of electronic device, to include the above-described tracking system implemented as a device. For example, the above-described tracking system and the various computing devices illustrated above as well as server devices, may be implemented as the example device 1800.

The device 1800 includes communication transceivers 1802 that enable wired and/or wireless communication of device data 1804 with other devices, such as tracking data described above. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1800 may also include one or more data input ports 1806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1800 includes a processor system 1808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1810. The device 1800 may further include any type of a system bus or other data and command transfer system that couples the various components within the device. A system bus can include any one or combination of different bus structures and architectures, as well as control and data lines.

The device 1800 also includes computer-readable storage memory 1812 (e.g., memory devices) that enable data storage, such as data storage devices that can be accessed by a computing device, and that provide persistent storage of data and executable instructions (e.g., software applications, programs, functions, and the like). Examples of the computer-readable storage memory 1812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1800 may also include a mass storage media device.

The computer-readable storage memory 1812 provides data storage mechanisms to store the device data 1804, other types of information and/or data, and various device applications 1814 (e.g., software applications). For example, an operating system 1816 can be maintained as software instructions with a memory device and executed by the processing system 1808. The device applications may also include a device manager, such as any form of a control application, software application, signal-processing and control module, code that is native to a particular device, a hardware abstraction layer for a particular device, and so on. In this example, the device 1800 includes tracking software 1818 that implements tracking embodiments, and may be implemented with hardware components and/or in software, such as when the device 1800 is implemented as a tracking system described above.

The device 1800 can also include a radio-frequency identification (RFID) tag 1820, as well as force sensors 1822, motion sensors 1824, and a variety of other sensors described above. The device 1800 can also include one or more power sources 1826, such as when the device is implemented as a mobile device The power sources may include a charging and/or power system, and can be implemented as a flexible strip battery, a rechargeable battery, a charged super-capacitor, and/or any other type of active or passive power source.

The device 1800 also includes an audio and/or video processing system 1828 that generates audio data for an audio system 1830 and/or generates display data for a display system 1832. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1834. In implementations, the audio system and/or the display system are integrated components of the example device. Alternatively, the audio system and/or the display system are external, peripheral components to the example device.

Although above-described embodiments have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method comprising:
   monitoring a user interaction with a product comprising a wearable item using one or more sensors on multiple RFID tags to gather information associated with the user's interaction with the product;
   determining, from the gathered information, a motion and force measurement based on the user's interaction with the one or more sensors on the multiple RFID tags;
   comparing the motion and force measurements from the one or more sensors on the multiple RFID tags based on the user's interaction effective to make an adjustment to the product that is personalized to the user; and
   based on the user's interaction and gathered information, generating a notification that is personalized to the user and conveying the notification to the user.

2. The method as recited in claim 1, wherein said adjustment is locally-based without communicating information to a source remote from the user.

3. The method as recited in claim 1, wherein said adjustment is remotely-based by conveying the gathered information to a remote source to enable the remote source to cause the adjustment to be made.

4. The method as recited in claim 3, wherein said conveying the gathered information comprises reading the information using an RFID reader and conveying the information read by the RFID reader to the remote source, wherein the information conveyed to the remote source includes a user identifier that identifies the user and which can be used to conduct a database lookup.

5. The method as recited in claim 1, wherein the gathered information includes environmental parameters that describe the user's interaction with the product, wherein the environmental parameters include one or more of: the way in which the user interacts with the product, or an effect that the user may impart to the product.

6. The method as recited in claim 5, wherein the effect that the user may impart to the product includes one or more of a physical effect with respect to the product, or a product movement.

7. The method as recited in claim 1, wherein the notification comprises a remedial notification.

8. The method as recited in claim 1, wherein the notification comprises a diagnostic notification.

9. The method as recited in claim 1, wherein the product includes one or more of: a shoe or shoes, compression socks, or a glove or gloves.

10. The method as recited in claim 1, wherein said adjustment is remotely-based by conveying the gathered information to a remote source to enable the remote source to cause the adjustment to be made, and
    the gathered information includes environmental parameters that describe the user's interaction with the product, wherein the environmental parameters include one or more of: the way in which the user interacts with the product, or an effect that the user may impart to the product.

11. The method as recited in claim 10, wherein the notification comprises a remedial notification.

12. The method as recited in claim 10, wherein the notification comprises a diagnostic notification.

13. A system comprising:
    a product comprising a wearable item;
    multiple RFID tags integrated with the wearable item;
    one or more sensors on the multiple RFID tags configured to monitor a user interaction with the product to gather information associated with the user's interaction with the product; and
    wherein the system is configured to:
       determine a motion and force measurement based on the user's interaction with the product;
       compare the motion and force measurements from the one or more sensors on the multiple RFID tags in order to generate a notification that is personalized to the user and convey that an adjustment should be made; and
       make a physical adjustment to the product based on the comparison.

14. The system as recited in claim 13, wherein the product comprises a shoe or shoes.

15. The system as recited in claim 13, wherein the product comprises compression socks.

16. The system as recited in claim 13, wherein the product comprises a glove or gloves.

17. The system as recited in claim 13, wherein adjustments are locally-based without communicating information to a remote source.

18. The system as recited in claim 13, wherein adjustments are remotely based by conveying the gathered information to a remote source to enable the remote source to cause the adjustment to be made.

19. The system as recited in claim 13, wherein said conveying the gathered information comprises reading the information using an RFID reader and conveying the information read by the RFID reader to a remote source, wherein the information conveyed to the remote source includes a user identifier that identifies the user and which can be used to conduct a database lookup.

20. The system as recited in claim 13, wherein the gathered information includes environmental parameters that describe the user's interaction with the product, wherein the environmental parameters include one or more of: the way in which the user interacts with the product, or an effect that the user may impart to the product.

* * * * *